US009017867B2

(12) United States Patent
Liu et al.

(10) Patent No.: US 9,017,867 B2
(45) Date of Patent: Apr. 28, 2015

(54) SELF ASSEMBLED MULTI-LAYER NANOCOMPOSITE OF GRAPHENE AND METAL OXIDE MATERIALS

(75) Inventors: Jun Liu, Richland, WA (US); Ilhan A. Aksay, Princeton, NJ (US); Daiwon Choi, Richland, WA (US); Rong Kou, Richland, WA (US); Zimin Nie, Richland, WA (US); Donghai Wang, Richland, WA (US); Zhenguo Yang, Richland, WA (US)

(73) Assignees: Battelle Memorial Institute, Richland, WA (US); The Trustees of Princeton University, Princeton, NJ (US)

( * ) Notice: Subject to any disclaimer, the term of this patent is extended or adjusted under 35 U.S.C. 154(b) by 320 days.

(21) Appl. No.: 12/462,857

(22) Filed: Aug. 10, 2009

(65) Prior Publication Data

US 2011/0033746 A1  Feb. 10, 2011

(51) Int. Cl.
| | |
|---|---|
| *H01M 4/62* | (2006.01) |
| *H01M 4/36* | (2006.01) |
| *H01M 4/485* | (2010.01) |
| *H01M 4/505* | (2010.01) |
| *H01M 4/525* | (2010.01) |
| *H01M 4/66* | (2006.01) |
| *H01M 10/0525* | (2010.01) |

(52) U.S. Cl.
CPC ............ *H01M 4/624* (2013.01); *Y10T 156/10* (2013.01); *Y10T 428/30* (2013.01); *H01M 4/366* (2013.01); *H01M 4/485* (2013.01); *H01M 4/505* (2013.01); *H01M 4/525* (2013.01); *H01M 4/663* (2013.01); *H01M 10/0525* (2013.01); *Y02E 60/122* (2013.01); *Y02T 10/7011* (2013.01)

(58) Field of Classification Search
CPC ..... H01M 4/624; H01M 4/525; H01M 4/485; H01M 4/366; H01M 4/663; H01M 4/505; H01M 10/0525; Y10T 428/30; Y10T 156/10; Y02T 10/7011; Y02E 60/22
USPC ...................... 429/209, 122; 423/448; 29/592
See application file for complete search history.

(56) References Cited

U.S. PATENT DOCUMENTS

| | | | |
|---|---|---|---|
| 5,958,367 A | 9/1999 | Ying et al. | |
| 5,972,088 A * | 10/1999 | Krishnan et al. | ........... 106/31.73 |
| 6,264,741 B1 | 7/2001 | Brinker et al. | |

(Continued)

FOREIGN PATENT DOCUMENTS

| | | |
|---|---|---|
| CN | 1483212 | 3/2004 |
| CN | 1588679 | 3/2005 |

(Continued)

OTHER PUBLICATIONS

Wang et al Journal of the Electrochemical Society vol. 151 No. 4 pp. A563-A570.*

(Continued)

*Primary Examiner* — Patrick Ryan
*Assistant Examiner* — Aaron Greso
(74) *Attorney, Agent, or Firm* — Klarquist Sparkman, LLP

(57) ABSTRACT

Nanocomposite materials having at least two layers, each layer consisting of one metal oxide bonded to at least one graphene layer were developed. The nanocomposite materials will typically have many alternating layers of metal oxides and graphene layers, bonded in a sandwich type construction and will be incorporated into an electrochemical or energy storage device.

24 Claims, 19 Drawing Sheets

(56) References Cited

U.S. PATENT DOCUMENTS

| | | | |
|---|---|---|---|
| 6,492,014 | B1 | 12/2002 | Rolison et al. |
| 7,001,669 | B2 | 2/2006 | Lu et al. |
| 7,094,499 | B1 | 8/2006 | Hung |
| 7,176,245 | B2 | 2/2007 | Stucky et al. |
| 7,309,830 | B2 | 12/2007 | Zhang et al. |
| 7,623,340 | B1 | 11/2009 | Song et al. |
| 7,875,219 | B2 | 1/2011 | Zhamu et al. |
| 8,257,867 | B2 | 9/2012 | Liu et al. |
| 2002/0022122 | A1* | 2/2002 | Hirata et al. ............... 428/220 |
| 2002/0054995 | A1 | 5/2002 | Mazurkiewicz |
| 2003/0086859 | A1 | 5/2003 | Kawakami et al. |
| 2004/0120880 | A1* | 6/2004 | Zhang et al. ............... 423/460 |
| 2004/0131934 | A1* | 7/2004 | Sugnaux et al. ............ 429/209 |
| 2004/0137225 | A1* | 7/2004 | Balkus et al. ............... 428/364 |
| 2004/0150140 | A1 | 8/2004 | Zhan et al. |
| 2006/0154071 | A1 | 7/2006 | Homma et al. |
| 2007/0092432 | A1 | 4/2007 | Prud'homme et al. |
| 2007/0158618 | A1 | 7/2007 | Song et al. |
| 2007/0212538 | A1 | 9/2007 | Niu |
| 2007/0281854 | A1 | 12/2007 | Harbour et al. |
| 2008/0063585 | A1 | 3/2008 | Smalley et al. |
| 2008/0258359 | A1 | 10/2008 | Zhamu et al. |
| 2008/0279756 | A1 | 11/2008 | Zhamu et al. |
| 2008/0302561 | A1 | 12/2008 | Prud'homme et al. |
| 2008/0312368 | A1 | 12/2008 | Prud'homme et al. |
| 2009/0117467 | A1* | 5/2009 | Zhamu et al. ............. 429/231.8 |
| 2009/0246625 | A1* | 10/2009 | Lu ............................. 429/207 |
| 2009/0290897 | A1 | 11/2009 | Doshoda et al. |
| 2009/0291270 | A1 | 11/2009 | Zettl et al. |
| 2009/0297947 | A1 | 12/2009 | Deng et al. |
| 2009/0303660 | A1 | 12/2009 | Nair et al. |
| 2009/0305135 | A1 | 12/2009 | Shi et al. |
| 2010/0081057 | A1 | 4/2010 | Liu et al. |
| 2010/0143798 | A1 | 6/2010 | Zhamu et al. |
| 2010/0159366 | A1 | 6/2010 | Shao-Horn et al. |
| 2010/0176317 | A1 | 7/2010 | Zhamu et al. |
| 2011/0045347 | A1 | 2/2011 | Liu et al. |
| 2011/0051316 | A1 | 3/2011 | Liu et al. |
| 2011/0111299 | A1 | 5/2011 | Liu et al. |
| 2012/0088158 | A1 | 4/2012 | Liu et al. |
| 2012/0295027 | A1 | 11/2012 | Liu et al. |
| 2012/0295096 | A1 | 11/2012 | Liu et al. |
| 2012/0305165 | A1 | 12/2012 | Liu et al. |
| 2014/0023925 | A1 | 1/2014 | Liu et al. |
| 2014/0030181 | A1 | 1/2014 | Liu et al. |

FOREIGN PATENT DOCUMENTS

| | | | |
|---|---|---|---|
| CN | 1793451 | 6/2006 | |
| CN | 101048055 | 10/2007 | |
| CN | 101139090 | 3/2008 | |
| CN | 101478043 | 7/2009 | |
| CN | 101752561 | 6/2010 | |
| JP | 10233211 | 9/1998 | |
| WO | WO2007/015710 | 2/2007 | |
| WO | WO 2007061945 A2 * | 5/2007 | ............... H01M 4/86 |
| WO | WO2008/013380 | 1/2008 | |
| WO | WO2008/106991 | 9/2008 | |
| WO | WO2008/143692 | 11/2008 | |
| WO | WO2009/023051 | 2/2009 | |
| WO | WO2009/085015 | 7/2009 | |
| WO | WO2010/014215 | 2/2010 | |
| WO | WO2010/030361 | 3/2010 | |
| WO | WO2011/019764 | 2/2011 | |
| WO | WO2011/019765 | 2/2011 | |

OTHER PUBLICATIONS

Ribeiro et al Nanostructure Science and Technolgy 2009 pp. 33-79 see pp. 62-63 ref 77+.*
PaekYoo and Honma Nano Letters 2009 vol. 9 No. 1 pp. 72-75 102a.*
Lindsay PhD Thesis Univ of Wollongong 2004 Chapter 2 Section 2.5.5 Research Online per {http://ro.uow.edu.au/theses/359}.*
Bizdoaca et al. (Journal of Magnetism and Magnetic Materials vol. 240 2002 pp. 44-46; p. 44 2nd col).*
McDermott et al Jounal of the Electrochemical Soc vol. 140 No. 9 Sep. 1993 pp. 2593-2599.*
Am. Soc. Mech. Engineers 256th Proceedings of the Applied Mechanics Div. pp. 277-291; Abstract.*
Murakami et al Materials Science forum vols. 445-446 2004 pp. 331-333 Abstract and Introduction.*
Wang et al Journal of the Electrochemical Society vol. 151 No. 4 pp. A563-A570 [2004].*
Shao California State Science Fair 2006 Project Summary J0531 http://www.usc.edu/CSSF/History/2006/Projects/J0531.pdf.*
Facts101 Physics vol. 1 Chapter15 Fluids p. 13 Key Terms (J. Walker 3rd ed.: { {http://books.google.com/books?id=fhRX6IFg2fcC&pg=PT278&lpg=PT278&dq= % 22Surfactants+are+compounds+that+ lower+the+ surface+tension+of+a+liquid%22+-2012+-2011+-2010+-2009 & source =bl& ots=cVS1AJ-GOS&sig=&source =bl&ots=cVS1AJ-GOS& sig=e9wgCJkhGYTe2zdqoql1y-iQG1o&hl=en&sa=X&ei=-6ErUO6NO6Wo0AGh74D4Bw&ved=e9wgCJkhGYTe2zdqoql1y-iQG1o&hl=en&sa=X&ei=-6ErUO6NO6Wo0AGh74D4Bw&ved=0CEUQ6AEwBA#v=onepage&q=%22Surfactants%20are%20compounds%20that%20lower%q=%22Surfactants%20are%20compounds%20that%20lower%the%20surface%20tension%20of%20a%20liquid%22%20-2012%20-2011%20-2010%20-2009&f=false}.*
Office action from U.S. Patent and Trademark Office for U.S. Appl. No. 12/553,527, mailed Nov. 10, 2011.
Restriction Requirement from the U.S. Patent and Trademark Office for U.S. Appl. No. 12/553,527, mailed Sep. 26, 2011.
Aksay et al., "Biomimetic Pathways for Assembling Inorganic Thin Films," *Science* 273:892-898 (Aug. 1996).
Aricò et al., "Nanostructured materials for advanced energy conversion and storage devices," *Nature Materials* 4:366-377 (May 2005).
Armstrong et al., "$TiO_2$-B Nanowires," *Angewandte Chemie-International Edition* 43:2286-2288 (Apr. 2004).
Armstrong et al., "$TiO_2$(B) Nanowires as an Improved Anode Material for Lithium-Ion Batteries Containing $LiFePO_4$ or $LiNi_{0.5}Mn_{1.5}O_4$ Cathodes and a Polymer Electrolyte," *Advanced Materials* 18:2597-2600 (Oct. 2006).
Asefa et al., "Periodic mesoporous organosilicas with organic groups inside the channel walls," *Nature* 402:867-871 (Dec. 1999).
Atkin et al., "Self-Assembly of a Nonionic Surfactant at the Graphite/Ionic Liquid Interface," *Journal of the American Chemical Society* 127:11940-11941 (Aug. 2005).
Attard et al., "Mesoporous Platinum Films from Lyotropic Liquid Crystalline Phases," *Science* 278:838-840 (Oct. 1997).
Bagshaw et al., "Templating of Mesoporous Molecular Sieves by Nonionic Polyethylene Oxide Surfactants," *Science* 269:1242-1244 (Sep. 1995).
Baudrin et al., "Structural evolution during the reaction of Li with nano-sized rutile type $TiO_2$ at room temperature," *Electrochemistry Communications* 9:337-342 (Feb. 2007).
Berger et al., "Electronic Confinement and Coherence in Patterned Epitaxial Graphene," *Science* 312:1191-1196 (May 2006).
Bonard et al., "Purification and Size-Selection of Carbon Nanotubes," *Advanced Materials* 9(10):827-831 (month unknown 1997).
Braun et al., "Semiconducting superlattices template by molecular assemblies," *Nature* 380:325-328 (Mar. 1996).
Chen et al., "Mechanically Strong, Electrically Conductive, and Biocompatible Graphene Paper," *Advanced Materials* 20:3557-3561 (Jul. 2008).
Chen et al., "Reducing Carbon in $LiFePO_4$/C Composite Electrodes to Maximize Specific Energy, Volumetric Energy, and Tap Density," *Journal of the Electrochemical Society* 149(9):A1184-A1189 (Sep. 2002).
Decher, "Fuzzy Nanoassemblies: Toward Layered Polymeric Multicomposites," *Science* 277(9):1232-1237 (Aug. 1997).
Dikin et al., "Preparation and characterization of graphene oxide paper," *Nature* 448:457-460 (Jul. 2007).

(56) References Cited

OTHER PUBLICATIONS

Dominko et al., "Impact of the Carbon Coating Thickness on the Electrochemical Performance of LiFePO$_4$/C Composites," *Journal of the Electrochemical Society* 152(3):A607-A610 (Jan. 2005).
Erjavec et al., "RuO$_2$-wired high-rate nanoparticulate TiO$_2$ (anatase): Suppression of particle growth using silica," *Electrochemistry Communications* 10:926-929 (Jun. 2008).
Goward et al., "Poly(pyrrole) and poly(thiophene)/vanadium oxide interleaved nanocomposites: positive electrodes for lithium batteries," *Electrochimica Acta* 43(10-11):1307-1303 (Apr. 1998).
Guo et al., "Superior Electrode Performance of Nanostructured Mesoporous TiO$_2$ (Anatase) through Efficient Hierarchical Mixed Conducting Networks," *Advanced Materials* 19:2087-2091 (Jul. 2007).
Herle et al., "Nano-network electronic conduction in iron and nickel olivine phosphates," *Nature Materials* 3:147-152 (Feb. 2004).
Hu et al., "High Lithium Electroactivity of Nanometer-Sized Rutile TiO$_2$," *Advanced Materials* 18:1421-1426 (Apr. 2006).
Hu et al., "Improved Electrode Performance of Porous LiFePO$_4$ Using RuO$_2$ as an Oxidic Nanoscale Interconnect," *Advanced Materials* 19:1963-1966 (Jul. 2007).
Huang et al., "Self-organizing high-density single-walled carbon nanotube arrays from surfactant suspensions," *Nanotechnology* 15:1450-1454 (Nov. 2004).
Huo et al., "Organization of Organic Molecules with Inorganic Molecular Species into Nanocomposite Biphase Arrays," *Chemistry Materials* 6:1176-1191 (Aug. 1994).
International Search Report for PCT/US2010/045088, mailed Oct. 6, 2010.
International Search Report for PCT/US2010/045089, mailed Oct. 27, 2010.
Jiang et al., "Nanocrystalline Rutile TiO$_2$ Electrode for High-Capacity and High-Rate Lithium Storage," *Electrochemical and Solid-State Letters* 10(5):A127-A129 (Mar. 2007).
Kavan et al., "Nanocrystalline TiO$_2$ (Anatase) Electrodes: Surface Morphology, Adsorption, and Electrochemical Properties," *Journal of the Electrochemical Society* 143(2):394-400 (Feb. 1996).
Kresge et al., "Ordered mesoporous molecular sieves synthesized by a liquid-crystal template mechanism," *Nature* 359:710-712 (Oct. 1992).
Leroux et al., "Electrochemical Lithium Intercalation into a Polyaniline/V$_2$O$_5$ Nanocomposite," *J. Electrochemical Society* 143(9):L181-L183 (Sep. 1996).
Li et al., "Processable aqueous dispersions of grapheme nanosheets," *Nature Nanotechnology* 3:101-105 (Jan. 2008).
Lou et al., "Template-Free Synthesis of SnO$_2$ Hollow Nanostructures with High Lithium Storage Capacity," *Advanced Materials* 18:2325-2329 (Aug. 2006).
Maier et al., "Nanoionics: ion transport and electrochemical storage in confined systems," *Nature Materials* 4:805-815 (Nov. 2005).
McAllister et al., "Single Sheet Functionalized Graphene by Oxidation and Thermal Expansion of Graphite," *Chemical Materials* 19:4396-4404 (May 2007).
Moriguchi et al., "A Mesoporous Nanocomposite of TiO$_2$ and Carbon Nanotubes as a High-Rate Li-Intercalation Electrode Material," *Advanced Materials* 18:69-73 (Jan. 2006).
Moskon et al., "Citrate-Derived Carbon Nanocoatings for Poorly Conducting Cathode," *Journal of the Electrochemical Society* 153(10):A1805-A1811 (Jul. 2006).
Nethravathi, et al., "Graphite Oxide-Intercalated Anionic Clay and Its Decomposition to Graphene-Inorganic Material Nanocomposites," *Langmuir* 24:8240-8244 (Aug. 2008).
Niyogi et al., "Solution Properties of Graphite and Graphene," *Journal of the American Chemical Society* 128:7720-7721 (Jan. 2006).
Novoselov et al., "Electric Field Effect in Atomically Thin Carbon Films," *Science* 306:666-669 (Oct. 2004).
Paek et al., "Enhanced Cyclic Performance and Lithium Storage Capacity of SnO$_2$/Graphene Nanoporous Electrodes with Three-Dimensionally Delaminated Flexible Structure," *Nano Letters* 9(1):72-75 (Dec. 2008).
Peigney et al., "Specific surface area of carbon nanotubes and bundles of carbon nanotubes," *Carbon* 39:507-514 (Apr. 2001).
Prosini et al., "Improved electrochemical performance of a LiFePO$_4$-based composite cathode," *Electrochimica Acta* 46:3517-3523 (Aug. 2001).
Ramanathan et al., "Functionalized graphene sheets for polymer nanocomposites," *Nature Nanotechnology* 3:327-331 (May 2008).
Read et al., "SnO$_2$-carbon composites for lithium-ion battery anodes," *Journal of Power Sources* 96:277-281 (Jun. 2001).
Reddy et al., "Room temperature synthesis and Li insertion into nanocrystalline rutile TiO$_2$," *Electrochemistry Communications* 8:1299-1303 (Aug. 2006).
Richard et al., "Supramolecular Self-Assembly of Lipid Derivatives on Carbon Nanotubes," *Science* 300:775-778 (May 2003).
Sakamoto et al., "Hierarchical battery electrodes based on inverted opal structures," *Journal of Materials Communication* 12:2859-2861 (Aug. 2002).
Schniepp et al., "Functionalized Single Graphene Sheets Derived from Splitting Graphite Oxide," *The Journal of Physical Chemistry Letters* 110:8535-8539 (Apr. 2006).
Schniepp et al., "Self-Healing of Surfactant Surface Micelles on Millisecond Time Scales," *Journal of the American Chemical Society* 128:12378-12379 (Aug. 2006).
Si, et al., "Synthesis of Water Soluble Graphene," *Nano Letters* 8(6):1679-1682 (May 2008).
Srinivas, et al., "Molecular Dynamics Simulations of Surfactant Self-Organization at a Solid-Liquid Interface," *Journal of the American Chemical Society* 128(3):848-853 (Jan. 2006).
Stankovich et al., "Graphene-based composite materials," *Nature* 442:282-286 (Jul. 2006).
Stankovich et al., "Stable aqueous dispersions of graphitic nanoplatelets via the reduction of exfoliated graphite oxide in the presence of poly(sodium 4-styrenesulfonate)," *Journal of Materials Chemistry* 16:155-158 (document marked Nov. 2005).
Stroller et al., "Graphene-Based Ultra capacitors," *Nano Letters* 8(10):3498-3502 (Sep. 2008).
Tarascon et al., "Issues and challenges facing rechargeable lithium batteries," *Nature* 414:359-367 (Nov. 2001).
Wang, et al., "Surface-Mediated Growth of Transparent, Oriented, and Well-Defined Nanocrystalline Anatase Titania Films," *Journal of the American Chemical Society* 128:13670-13671 (Oct. 2006).
Wang et al., "Low-Temperature Synthesis of Tunable Mesoporous Crystalline Transition Metal Oxides and Applications as Au Catalyst Supports," *Chemistry of Materials* 20:13499-13509 (Aug. 2008).
Wang, et al., "Atomic Layer Deposition of Metal Oxides on Pristine and Functionalized Graphene," *Journal of the American Chemical Society* 130:8152-8153 (Jun. 2008).
Wang, et al., "Cooperative Self-Assembly of Tertiary Systems: Novel Graphene-Metal Oxide Nanocomposites," *Pacific Northwest National Laboratory* and *Princeton University* 21 pages (date unknown).
Watcharotone et al., "Graphene-Silica Composite Thin Films as Transparent Conductors," *Nano Letters* 7(7)1888-1892 (Jun. 2007).
Whitesides, et al., "Molecular Self-Assembly and Nanochemistry: A Chemical Strategy for the Synthesis of Nanostructures," *Science* 254:1312-1319 (Nov. 1991).
Williams, et al., "TiO$_2$-Graphene Nanocomposites. UV-Assisted Photocatalytic Reduction of Graphene Oxide," *Acs Nano* 2(7):1487-1491 (Jul. 2008).
Xu, et al., "Flexible Graphene Films via the Filtration of Water-Soluble Noncovalent Functionalized Graphene Sheets," *Journal of the American Chemical Society* 130:5856-5857 (Apr. 2008).
Yamabi, et al., "Crystal Phase Control for Titanium Dioxide Films by Direct Deposition in Aqueous Solutions," *Chemical Materials* 14:609-614 (Jan. 2002).
Yang, et al., "Generalized syntheses of large-pore mesoporous metal oxides with semicrystalline frameworks," *Nature* 396:152-155 (Nov. 1998).
Yoo, et al., "Large Reversible Li Storage of Graphene Nanosheet Families for Use in Rechargeable Lithium Ion Batteries," *Nano Letters* 8(8):2277-2282 (Aug. 2008).

(56) References Cited

OTHER PUBLICATIONS

Zhao et al., "Triblock Copolymer Syntheses of Mesoporous Silica with Periodic 50 to 300 Angstrom Pores," *Science* 279:548-552 (Jan. 1998).
Zhou et al., "Lithium Insertion into $TiO_2$ Nanotube Prepared by the Hydrothermal Process," *Journal of the Electrochemical Society* 150(9):A1246-A1249 (Jul. 2003).
Zukalová et al., "Pseudocapacitive Lithium Storage in $TiO_2(B)$," *Chemistry of Materials* 17:1248-1255 (Feb. 2005).
Gòmez-Navarro et al., "Electronic Transport Properties of Individual Chemically Reduced Graphene Oxide Sheets," *Nano Letters*, 7(11):3499-3503 (Oct. 2007).
Liu et al., "Oriented Nanostructures for Energy Conversion and Storage," *ChemSusChem*, 1:676-697 (Aug. 2008).
Office action from U.S. Patent and Trademark Office for U.S. Appl. No. 12/460,993, mailed Jan. 19, 2012.
Office action from U.S. Patent and Trademark Office for U.S. Appl. No. 12/852,794, mailed Jan. 23, 2012.
Superior Graphite Company, "Development of Low cost Carbonaceous Materials for Anodes in Lithium-Ion Batteries for Electric and Hybrid Electric Vehicles," DE-F02-00EE50630, 50 pages (Dec. 10, 2002).
Tung et al., "Low-temperature solution processing of graphene-carbon nanotube hybrid materials for high-performance transparent conductors," *Nano Lett.*, 9(5):1949-1955 (Apr. 2009).
U.S. Appl. No. 12/980,328, filed Dec. 28, 2010.
Wang et al., "Self-Assembled TiO-Graphene Hybrid Nanostructures for Enhanced Li-Ion Insertion," *ACS Nano*, 3(4):907-914 (Mar. 26, 2009).
Wang, et al., "Synthesis and Li-Ion Insertion Properties of Highly Crystalline Mesoporous Rutile $TiO_2$," *Chem. Mater.*, 20:3435-3442 (May 2008).
Wang et al., "Tin Nanoparticle Loaded Graphite Anodes for Li-Ion Battery Applications," *Journal of the Electrochemical Society*, 151(11):A563-A570 (Oct. 4, 2004).
Xu et al., "Assembly of chemically modified graphene: methods and applications," *J. Mater. Chem.*, 21:3311-3323 (Mar. 2011).
Choi et al., "Li-ion batteries from $LiFePO_4$ cathode and anatase/graphene composite anode for stationary energy storage," *Electrochemistry Communications* 12(3):378-381 (Jan. 2010).
Franger et al., "Optimized Lithium Iron Phosphate for High-Rate Electrochemical Application," *Journal of the Electrochemical Society*, vol. 151, No. 7, pp. A1024-A1027 (May 2004).
International Preliminary Report on Patentability and Written Opinion for PCT/US2009/004369 (mailed Feb. 10, 2011).
International Preliminary Report on Patentability and Written Opinion for PCT/US2010/045088 (mailed Feb. 23, 2012).
International Preliminary Report on Patentability and Written Opinion for PCT/US2010/045089 (mailed Feb. 23, 2012).
International Search Report and Written Opinion for PCT/US2011/047144 (mailed Feb. 23, 2012).
International Search Report and Written Opinion for PCT/US2011/055216 (mailed Apr. 23, 2012).
International Search Report and Written Opinion for PCT/US2011/62016 (mailed Apr. 9, 2012).
Office action from U.S. Patent and Trademark Office for U.S. Appl. No. 12/553,527, mailed Jun. 1, 2012.
Ou et al., "Characteristics of graphene-layer encapsulated nanoparticles fabricated using laser ablation method," *Diamond and Related Materials* 17(4-5):664-668 (Apr.-May 2008).
Final Office action from U.S. Patent and Trademark Office for U.S. Appl. No. 12/553,527, mailed Nov. 20, 2012.
Final Office action from U.S. Patent and Trademark Office for U.S. Appl. No. 12/852,794, mailed Jul. 3, 2012.
Mdleleni et al., "Sonochemical Synthesis of Nanostructured Molybdenum Sulfide," *Journal of the American Chemical Society* 12:6189-6190 (Jun. 1998).
Notice of Allowance from U.S. Patent and Trademark Office for U.S. Appl. No. 12/460,993, mailed Jul. 11, 2012.
Office action from the Chinese Patent Office for Chinese Patent Application No. 200980135205.8, mailed Nov. 14, 2012.
Office action from the Chinese Patent Office for Chinese Patent Application No. 200980129673.4, mailed Sep. 10, 2012.
Office action from U.S. Patent and Trademark Office for U.S. Appl. No. 12/901,526, mailed Dec. 3, 2012.
Restriction Requirement from the U.S. Patent and Trademark Office for U.S. Appl. No. 12/901,527, mailed Dec. 13, 2012.
Slack, "Thermal Conductivity of Pure and Impure Silicon, Silicon Carbide, and Diamond," *Journal of Applied Physics* 35(12):3460-3466 (Dec. 1964).
Suslick et al., "Sonochemical synthesis of amorphous iron," *Nature* 353:414-416 (Oct. 1991).
Yao et al., "In situ chemical synthesis of $SnO2$-graphene nanocomposite as anode materials for lithium-ion batteries," *Electrochemistry Communications* 11:1849-1852 (Aug. 2009).
Yu et al., "Mesoporous tin oxides as lithium intercalation anode materials," *Journal of Power Sources* 104:97-100 (Jan. 2002).
Corrected Notice of Allowance from U.S. Patent and Trademark Office for U.S. Appl. No. 13/559,528, mailed Jul. 23, 2013.
Final Office action from U.S. Patent and Trademark Office for U.S. Appl. No. 13/559,538, mailed Mar. 4, 2014.
Final Office action from U.S. Patent and Trademark Office for U.S. Appl. No. 13/585,741, mailed May 23, 2013.
Kim et al., "Direct synthesis of uniform mesoporous carbons from the carbonization of as-synthesized silica/triblock copolymer nanocomposites," *Carbon*, 42:2711-2719 (2004).
Notice of Allowance from U.S. Patent and Trademark Office for U.S. Appl. No. 12/901,526, mailed Apr. 15, 2013.
Notice of Allowance from U.S. Patent and Trademark Office for U.S. Appl. No. 13/559,528, mailed Jul. 1, 2013.
Notice of Allowance from U.S. Patent and Trademark Office for U.S. Appl. No. 12/901,527, mailed Aug. 2, 2013.
Office action from the Chinese Patent Office for Chinese Patent Application No. 200980129673.4, mailed Mar. 7, 2013.
Office action from the Chinese Patent Office for Chinese Patent Application No. 200980135205.8, mailed Oct. 9, 2013.
Office action from the Chinese Patent Office for Chinese Patent Application No. 201080045223X, mailed Jan. 3, 2014.
Office action from the Chinese Patent Office for Chinese Patent Application No. 201080045283.1, mailed Feb. 11, 2014.
Office action from U.S. Patent and Trademark Office for U.S. Appl. No. 12/901,527, mailed Apr. 8, 2013.
Office action from U.S. Patent and Trademark Office for U.S. Appl. No. 12/980,328, mailed Feb. 27, 2013.
Office action from U.S. Patent and Trademark Office for U.S. Appl. No. 12/980,328, mailed Mar. 27, 2014.
Office action from U.S. Patent and Trademark Office for U.S. Appl. No. 13/559,538, mailed Jul. 1, 2013.
Office action from U.S. Patent and Trademark Office for U.S. Appl. No. 12/553,527, mailed Jul. 24, 2013.
Restriction Requirement from the U.S. Patent and Trademark Office for U.S. Appl. No. 13/559,528, mailed Oct. 29, 2012.
Seeger et al., "Nanotube composites: novel $SiO_2$ coated carbon nanotubes," *Chem Commun.* 34-35 (2002).
The Free Dictionary (Collins English Dictionary Entry) http://www.thefreedictionary.com/p/slurry (printed Apr. 15, 2015).
Wang et al., "Surfactant-Mediated Synthesis of a Novel Nanoporous Carbon—Silica Composite," *Chem. Mater.* 15:2926-2935 (Jun. 2003).
Kang et al., "The Cycling Performance of Graphite Electrode Coated with Tin Oxide for Lithium Ion Battery," *Journal of the Korean Electrochemical Society*, 5(2):52-56 (May 2002).
Nakahara et al., "Structural changes of a pyrolytic graphite surface oxidized by electrochemical and plasma treatment," *Journal of Materials Science*, 29(12):3193-3199 (Jun. 1994).
Office action from U.S. Patent and Trademark Office for U.S. Appl. No. 13/559,528, mailed Jan. 10, 2013.
Office action from U.S. Patent and Trademark Office for U.S. Appl. No. 13/585,741, mailed Jan. 14, 2013.
USP, "Material Safety Data Sheet—Sodium Lauryl Sulfate," Catalog No. 1614363 (Oct. 28, 2010).

(56) References Cited

OTHER PUBLICATIONS

Wakihara et al., "Lithium Ion Batteries Fundamentals and Performance," Wiley-VCH, New York (1998).
International Preliminary Report on Patentability and Written Opinion for PCT/US2009/005085 (mailed Mar. 24, 2011).
International Search Report and Written Opinion for PCT/US2009/004369 (mailed Jan. 29, 2010).
International Search Report for PCT/US2009/005085 (mailed Feb. 4, 2010).
Mao et al., "Structural, electronic and magnetic properties of manganese doping in the upper layer of bilayer graphene," *Nanotechnology* 19(20):205708-205715 (May 2008).
Nishihara et al., "Carbon-coated mesoporous silica with hydrophobicity and electrical conductivity," *Carbon* 46(1):pp. 48-53 (Jan. 2008).
Suzuki et al., "H-T phase diagram and the nature of vortex-glass phase in a quasi-two-dimensional superconductor: Sn-metal layer sandwiched between graphene sheets," *Physica C: Superconductivity* 402(3):243-256 (Nov. 2003).
Tanaka et al., "Characteristics of graphene-layer encapsulated nanoparticles fabricated using laser ablation method," *Diamond and Related Materials* 17(4-5):664-668 (Nov. 2007).
Final Office action from U.S. Patent and Trademark Office for U.S. Appl. No. 12/980,328, mailed Oct. 6, 2014.
Notice of Allowance from U.S. Patent and Trademark Office for U.S. Appl. No. 12/852,794, mailed Jul. 17, 2014.
Office action from the Chinese Patent Office for Chinese Patent Application No. 200980129673.4, mailed Apr. 21, 2014.
Office action from the European Patent Office for European Patent Application No. 09789026.3, mailed Jun. 2, 2014.
Office action from the European Patent Office for European Patent Application No. 09789291.3, mailed Jun. 2, 2014.
Partoens et al., "From graphene to graphite: Electronic structure around the K point," *Phys. Rev. B.*, vol. 74, pp. 075404-1-075404-11, (Aug. 2006).
Sandru, "Wax Helps Scientists Reach Theoretical Storage Limit for Lithium Manganese Phosphate Batteries," published on line at http://www.greenoptimistic.com/201 0/08/14/wax-lithium-manganese-phosphate-batteries/#.VBimlfn lbgw (Aug. 2010).
Final Office action from U.S. Patent and Trademark Office for U.S. Appl. No. 12/553,527, mailed Apr. 11, 2014.
Office action from the Chinese Patent Office for Chinese Patent Application No. 201180047687.9, mailed Nov. 3, 2014.
Office action from the European Patent Office for European Patent Application No. 10747347.2, mailed Dec. 12, 2014.
Zhang, "Mono dispersed $SnO_2$ nanoparticles on both sides of single layer graphene sheets as anode materials in Li-ion batteries," *J. Mater. Chem.*, vol. 20, pp. 5462-5467 (Jun. 2010).
Office action from the Chinese Patent Office for Chinese Patent Application No. 200980129673.4, mailed Sep. 3, 2014.
Office action from the Chinese Patent Office for Chinese Patent Application No. 201080045223X, mailed Aug. 12, 2014.
Office action from the Chinese Patent Office for Chinese Patent Application No. 201080045283.1, mailed Sep. 24, 2014.
Office action from U.S. Patent and Trademark Office for U.S. Appl. No. 12/553,527, mailed Oct. 15, 2014.
Office action from U.S. Patent and Trademark Office for U.S. Appl. No. 13/559,538, mailed Sep. 26, 2014.

* cited by examiner

SELF ASSEMBLED MULTI-LAYER NANOCOMPOSITE OF GRAPHENE AND METAL OXIDE MATERIALS

The invention was made with Government support under Contract DE-AC0676RLO 1830, awarded by the U.S. Department of Energy. The Government has certain rights in the invention.

TECHNICAL FIELD

This invention relates to nanocomposite materials of graphene bonded to metal oxides, devices using such materials, methods for forming nanocomposite materials of graphene bonded to metal oxides, and devices using those materials. More specifically, this invention relates to self-assembling multi-layer nanocomposite materials of graphene bonded to metal oxides, devices using such materials, methods for forming self-assembling multi-layer nanocomposite materials of graphene bonded to metal oxides and devices using those materials.

BACKGROUND OF THE INVENTION

Graphene is generally described as a one-atom-thick planar sheet of sp2-bonded carbon atoms that are densely packed in a honeycomb crystal lattice. The carbon-carbon bond length in graphene is approximately 0.142 nm. Graphene is the basic structural element of some carbon allotropes including graphite, carbon nanotubes and fullerenes. Graphene exhibits unique properties, such as very high strength and very high conductivity. Those having ordinary skill in the art recognize that many types of materials and devices may be improved if graphene is successfully incorporated into those materials and devices, thereby allowing them to take advantage of graphene's unique properties. Thus, those having ordinary skill in the art recognize the need for new methods of fabricating graphene and composite materials that incorporated graphene.

Graphene has been produced by a variety of techniques. For example, graphene is produced by the chemical reduction of graphene oxide, as shown in Gomez-Navarro, C.; Weitz, R. T.; Bittner, A. M.; Scolari, M.; Mews, A.; Burghard, M.; Kern, K. Electronic Transport Properties of Individual Chemically Reduced Graphene Oxide Sheets. and *Nano Lett.* 2007, 7, 3499-3503. Si, Y.; Samulski, E. T. Synthesis of Water Soluble Graphene. *Nano Lett.* 2008, 8, 1679-1682.

While the resultant product shown in the forgoing methods is generally described as graphene, it is clear from the specific capacity of these materials that complete reduction is not achieved, because the resultant materials do not approach the theoretical specific capacity of neat graphene. Accordingly, at least a portion of the graphene is not reduced, and the resultant material contains at least some graphene oxide. As used herein, the term "graphene" should be understood to encompass materials such as these, that contain both graphene and small amounts of graphene oxide.

For example, functionalized graphene sheets (FGSs) prepared through the thermal expansion of graphite oxide as shown in McAllister, M. J.; LiO, J. L.; Adamson, D. H.; Schniepp, H. C.; Abdala, A. A.; Liu, J.; Herrera-Alonso, M.; Milius, D. L.; CarO, R.; Prud'homme, R. K.; Aksay, I. A. Single Sheet Functionalized Graphene by Oxidation and Thermal Expansion of Graphite. *Chem. Mater.* 2007, 19, 4396-4404 and Schniepp, H. C.; Li, J. L.; McAllister, M. J.; Sai, H.; Herrera-Alonso, M.; Adamson, D. H.; Prud'homme, R. K.; Car, R.; Saville, D. A.; Aksay, I. A. Functionalized Single Graphene Sheets Derived from Splitting Graphite Oxide. *J. Phys. Chem. B* 2006, 110, 8535-8539 have been shown to have tunable C/O ratios ranging from 10 to 500. The term "graphene" as used herein should be understood to include both pure graphene and graphene with small amounts of graphene oxide, as is the case with these materials.

Further, while graphene is generally described as a one-atom-thick planar sheet densely packed in a honeycomb crystal lattice, these one-atom-thick planar sheets are typically produced as part of an amalgamation of materials, often including materials with defects in the crystal lattice. For example, pentagonal and heptagonal cells constitute defects. If an isolated pentagonal cell is present, then the plane warps into a cone shape. Likewise, an isolated heptagon causes the sheet to become saddle-shaped. When producing graphene by known methods, these and other defects are typically present.

The IUPAC compendium of technology states: "previously, descriptions such as graphite layers, carbon layers, or carbon sheets have been used for the term graphene . . . it is not correct to use for a single layer a term which includes the term graphite, which would imply a three-dimensional structure. The term graphene should be used only when the reactions, structural relations or other properties of individual layers are discussed". Accordingly, while it should be understood that while the terms "graphene" and "graphene layer" as used in the present invention refers only to materials that contain at least some individual layers of single layer sheets, the terms "graphene" and "graphene layer" as used herein should therefore be understood to also include materials where these single layer sheets are present as a part of materials that may additionally include graphite layers, carbon layers, and carbon sheets.

The unique electrical and mechanical properties of graphene have led to interest in its use in a variety of applications. For example, electrochemical energy storage has received great attention for potential applications in electric vehicles and renewable energy systems from intermittent wind and solar sources. One such energy storage application is Lithium ion (Li-ion) batteries.

Currently, Li-ion batteries are used in a variety of portable electronic devices. As a result of their excellent weight to power ratio, they are also being considered as the leading candidates for hybrid, plug-in hybrid and all electrical vehicles, and possibly for utility applications as well. However, many potential electrode materials (e.g., oxide materials) in Li-ion batteries are limited by slow Li-ion diffusion, poor electron transport in electrodes, and increased resistance at the interface of electrode/electrolyte at high charging-discharging rates.

For Li-ion batteries, $SnO_2$, Sn and Si are promising high capacity anode materials, but have large volume expansions upon lithiation, causing degradation and rapid fading during charge/discharge cycling. Efforts have been made to prepare composite materials to mix metal oxides and conductive materials such as amorphous carbon, carbon nanotubes and graphene, as discussed in Moriguchi, I.; Hidaka, R.; Yamada, H.; Kudo, T.; Murakami, H.; Nakashima, N. *Advanced Materials* 2006, 18, 69-73; Zhang, W. M.; Hu, J. S.; Guo, Y. G.; Zheng, S. F.; Zhong, L. S.; Song, W. G.; Wan, L. J. *Advanced Materials* 2008, 20, 1160; and Huang, H.; Yin, S. C.; Nazar, L. F. *Electrochemical and Solid State Letters* 2001, 4, A170-A172.

Recently pre-synthesized metal oxide nanoparticles (e.g., $TiO_2$ and $SnO_2$) were deposited on graphene surfaces to form nanocomposites as described in Williams, G.; Seger, B.; Kamat, P. V. *ACS Nano* 2008, 2, 1487-1491; and Paek, S.-M.; Yoo, E.; Honma, I. *Nano Letters* 2009, 9, 72-75. Other studies, including Niyogi, S.; Bekyarova, E.; Itkis, M. E.; McWilliams, J. L.; Hamon, M. A.; Haddon, R. C. *Journal of the American Chemical Society* 2006, 128, 7720-7721; Si, Y.; Samulski, E. T. *Nano Letters* 2008, 8, 1679-1682, Stankovich, S.; Piner, R. D.; Chen, X. Q.; Wu, N. Q.; Nguyen, S. T.; Ruoff, R. S. *Journal of Materials Chemistry* 2006, 16, 155-158; and Xu, Y. X.; Bai, H.; Lu, G. W.; Li, C.; Shi, G. Q. *Journal of the American Chemical Society* 2008, 130, 5856, have shown that homogeneous dispersion of the conductive and the active phases remains difficult.

While these results were promising, they fell short of producing materials exhibiting specific capacity approaching the theoretical possibilities. For example, while it has been shown that graphene may be combined with certain metal oxides, the graphene materials in these studies fall far short of the theoretical maximum conductivity of single-sheet graphene. Further, those having ordinary skill in the art recognize that the carbon:oxygen ratio and the specific surface area of graphene provide an excellent proxy to measure the relative abundance of high conductivity single-sheets in a given sample. This is because the C:O ratio is a good measure of the degree of "surface functionalization" which affects conductivity, and the surface area conveys the percentage of single-sheet graphene in the synthesized powder.

Accordingly, those having ordinary skill in the art recognize that improvements to these methods are required to achieve the potential of using graphene nanostructures in these and other applications. Specifically, those skilled in the art recognize the need for new methods that produce nanocomposite materials of graphene and metal oxides that exhibit greater specific capacity and stability than demonstrated in these prior art methods. Further, those of ordinary skill in the art recognize a need for homogeneous dispersion of the conductive and the active phases, and methods for providing such materials.

The present invention fulfills these needs, and provides such improved composite nanostructures of graphene layers and metal oxides that exhibit specific capacities heretofore unknown in the prior art. The present invention further provides improved and novel methods for forming these composite nanostructures, and improved and novel devices that take advantage of the new and unique properties exhibited by these materials. The present invention meets these objectives by making nanostructures of graphene layers and metal oxides where the C:O ratio of the graphene layers in these nanostructures is between 15-500:1, and preferably 20-500:1, and the surface area of the graphene layers in these nanostructures is 400-2630 m2/g, and preferably 600-2630 m2/g, as measured by BET nitrogen adsorption at 77K. While those having ordinary skill in the art have recognized the desirability of having C:O ratios and surface areas this high in the graphene of nanostructures of graphene and metal oxides, the prior art methods have failed to produce them. The present invention further provides homogeneous dispersion of the conductive and the active phases.

SUMMARY OF THE INVENTION

These and other benefits are provided by one aspect of the present invention; a nanocomposite material having at least two layers, each layer consisting of one metal oxide bonded to at least one graphene layer. Typically, the nanocomposite material will have many alternating layers of metal oxides and graphene layers, assembled in a sandwich type construction. Preferably, but not meant to be limiting, the metal oxide used in the nanocomposite material of the present invention is $M_xO_y$, where M is selected as Ti, Sn, Ni, Mn, Si, V, and combinations thereof.

Also preferably, but not meant to be limiting, in the nanocomposite materials of the present invention at least one layer of the metal oxide is a mesoporous metal oxide. Also preferably, but not meant to be limiting, the nanocomposite material of the present invention is characterized by a specific capacity of greater than about 400 mAh/g.

Preferably, the graphene layers of the nanocomposite materials of the present invention have a thickness between 3 and 20 nm, and more preferably between about 0.5 and 50 nm. Also preferable, but not meant to be limiting, the graphene layers of the nanocomposite materials of the present invention have a carbon to oxygen ratio of between 15 to 1 and 500 to 1 and more preferably between about 20 to 1 and 500 to 1. Also preferably, but not meant to be limiting, the graphene layers of the nanocomposite materials of the present invention have a surface area of between 400 and 2630 m2/g and more preferably between about 600 and 2630 m2/g.

Another aspect of the present invention is a method for forming a nanocomposite material comprising at least two layers, each layer consisting of one metal oxide bonded to at least one graphene layer. This method involves the steps of providing graphene in a suspension; dispersing the graphene with a surfactant; adding a metal oxide precursor; precipitating the metal oxide and allowing the graphene and the metal oxide to organize into self assembled structures.

In this manner, the method of the present invention thereby forms a series of ordered layers, wherein each layer comprises a metal oxide bonded to at least one graphene layer. Those having ordinary skill in the art and the benefit of this disclosure will recognize that the steps of precipitating the metal oxide and allowing the graphene and the metal oxide to organize into self assembled structures may be performed simultaneously, or in either order. Further, those having ordinary skill in the art and the benefit of this disclosure will recognize that while the self assembly process will often result in the metal oxide portions of each successive layer being bound to the graphene portion of an adjacent layer, such is not necessarily the case. For example, and not meant to be limiting, it may be the case that a self assembled structure will form whereby the metal oxide portion of one layer will be bound to the metal oxide portion of a successive layer, or that metal oxide may form into a series of layers. All such self assembled structures should be understood to fall within the invention as described herein, provided that at least two of the layers in that structure comprise a metal oxide bonded to at least one graphene layer.

The suspension of the present invention may be water, or may contain water with other liquids. The method of the present invention may further include the step of precipitating the metal oxide wherein precipitating is maintained for about one to about 24 hours.

Preferably, but not meant to be limiting, the method of the present invention further includes the step of heating the final precipitate from 50 to 500 degrees C. to condense the metal oxide on the graphene surface. Also preferably, but not meant to be limiting, the method of the present invention may further include the step of heating the final precipitate from 50 to 500 degrees C. to remove the surfactant.

The present invention thus includes a nanocomposite material formed by the forgoing method. The nanocomposite material formed by this method is preferably formed into an ordered three-dimensional superstructure having multilength and multiphase building blocks of graphene layers and metal oxide layers, and at least two layers of the nanocomposite material include a metal oxide bonded to graphene. The nanocomposite materials preferably have a thickness between 3 and 20 nm.

While not meant to be limiting, the nanocomposite layers of the present invention find particular utility in energy storage applications. Accordingly, another aspect of the present invention is an energy storage device having a nanocomposite material including at least two layers, each layer having at least one metal oxide bonded to at least one graphene layer. In this application, it is preferred that the nanocomposite material have a specific capacity greater than about 400 mAh/g.

While not meant to be limiting, the nanocomposite layers of the present invention find particular utility as electrochemical devices. In this application, the nanocomposite layers of the present invention have at least one component formed in whole or in part of a nanocomposite material including at least one active metal compound and one graphene layer arranged in a nanoarchitecture. As will be recognized by those having ordinary skill in the art and the benefit of this disclosure, the component may selected as an electrode, an anode, a cathode, a separator, a current collector, an electrolyte, and combinations thereof.

Preferably, but not meant to be limiting, in the embodiment of the present invention where the nanocomposite material is used in the anode of an energy storage device, the anode contains less than 10% carbon-based material by weight, and more preferably less than 5% carbon-based material by weight.

Preferably, but not meant to be limiting, in the embodiment of the present invention where the nanocomposite material is used in the cathode of an energy storage device, the cathode contains less than 5% carbon-based material by weight, and more preferably less than 2.5% carbon-based material by weight.

One example of the present invention that is an electrochemical device and an energy storage device is a lithium ion battery. For example, and not meant to be limiting, one embodiment of the present invention is thus a lithium ion battery having an electrode, wherein the electrode has a nanocomposite material which has at least two layers, each layer including a metal oxide bonded to at least one graphene layer, and wherein said nanocomposite material has a specific capacity of greater than about 400 mAh/g, and wherein each layer includes a metal oxide bonded to graphene, and wherein the layers are provided as an ordered, three dimensional assembly.

As used herein, the term "electrochemical device" includes energy storage devices, energy conversion devices, sensors, and other devices that convert electrical energy to chemical energy, or chemical energy to electrical energy. As used herein, the term "energy storage device" includes batteries and supercapacitors.

BRIEF DESCRIPTION OF THE DRAWINGS

The following detailed description of the embodiments of the invention will be more readily understood when taken in conjunction with the following drawing, wherein:

FIG. 3(a) is the XRD pattern of the $SnO_2$-graphene nanocomposite powder (15 wt % graphene). Standard reflection peaks of cassiterite $SnO_2$ (JCPDS No. 000-0024) are shown as vertical bars.

FIG. 6 (C) is a TEM image showing worm-like structure of $SnO_2$ nanocrystals formed through reaction without graphene. FIG. 6 (D) is a cross-sectional TEM image of $SiO_2$-graphene nanocomposite powder (30 wt % $SiO_2$). Partially ordered mesoporous silica layers (4-5 mesoporous layer) are observed on the surface of graphene sheets following the contour of wrinked graphene sheets. FIG. 6 (E) is a high-resolution TEM image of the $SiO_2$-graphene nanocomposite powder in FIG. 6 (D). Graphene sheets are covered with hexagonal mesoporous silica.

FIG. 7 (B) is a high-magnification cross-sectional SEM image of the free standing $SnO_2$-graphene nanocomposite electrode. The electrode is composed of well-packed wavy layers interspaced by the loosely packed layers through almost the entire cross section. FIG. 7 (C) is a schematic illustration of a Li-ion test configuration using a free-standing metal oxide-graphene nanocomposite electrode as an anode. The graphene in the layered superstructures functions as both current collector and conductive additives in the anode. FIG. 7 (D) is a graph showing the charge-discharge profiles of $SnO_2$-graphene nanocomposite paper electrode (40 wt % graphene) between 0 V and 1.5 V at current densities of 0.008 A/g, 0.02 A/g and 0.08 A/g, respectively. FIG. 7 (E) is a graph showing the specific capacity of $SnO_2$ as a function of charge-discharge cycles in the $SnO_2$-graphene nanocomposite paper electrode at current density of 0.01 A/g on top, and the specific capacity of $SnO_2$ as a function of charge-discharge cycles in the $SnO_2$-graphene nanocomposite paper at different charge/discharge current density of 0.008 A/g, 0.08 A/g and 0.02 Ng, respectively on the bottom. FIG. 7 (F) is a graph showing the cyclic voltammograms of $SiO_2$-graphene nanocomposite powder (30 wt % graphene) and FGSs measured in 1M $Na_2SO_4$ aqueous solution under a scan rate of 2 mV/s with saturated Ag/AgCl as reference electrode.

FIG. 8 (a) is a low-magnification TEM image, FIG. 8 (b) is a high-magnification TEM image showing the layered superstructure, and FIG. 8 (c) is a high-resolution TEM image showing alternating layers of nanocrystalline $SnO_2$ and graphene sheets.

DETAILED DESCRIPTION OF THE PREFERRED EMBODIMENTS

Figure 1A:
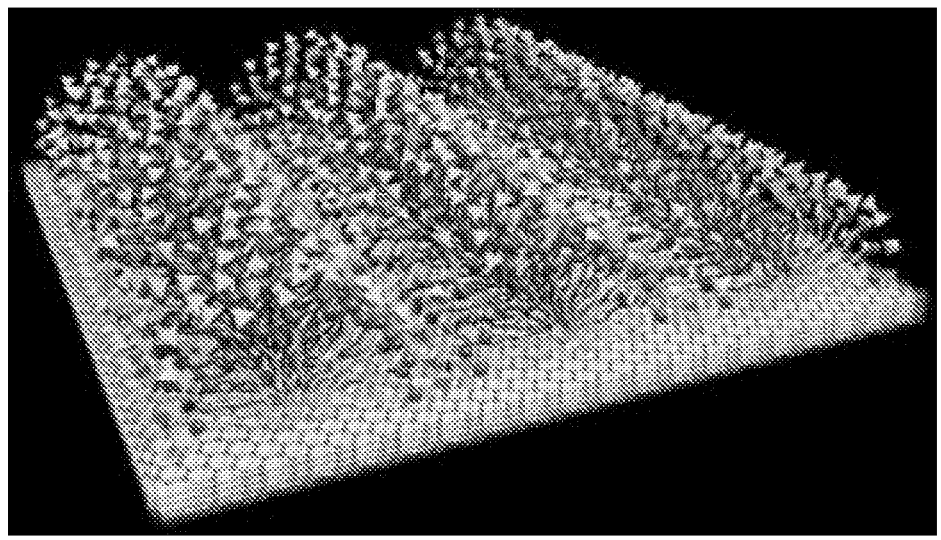
FIG. 1 is a schematic illustration of the multiphase self-assembly approach of the present invention. 1(A) shows self-assembled hemimicelles on graphite surfaces. 1(B) shows absorption of surfactant hemimicelles on graphene sheets and dispersed macromolecular graphene sheets and surfactant micelles in an aqueous solution. The dispersed graphene sheets can be used as the macromolecular template and the nanophase building block for self-assembly of three-dimensional nanocomposites. 1(C) shows self-assembly of anionic SDS surfactant on graphene surface with oppositely charged metal cation (e.g., $Sn^{2+}$) oxy species into lamella mesophase superstructures toward formation of $SnO_2$-graphene nanocomposites, where hydrophobic graphene sheets are sandwiched in the hydrophobic domains of the anionic surfactant. 1(D) shows metal oxide-graphene layered superstructures composed of alternating layers of metal oxide nanocrytals and graphene layers after crystallization of metal oxide and removal of the surfactant. 1(E) shows self-assembled hexagonal mesostructure of metal oxide precursor (e.g., silicate) with non-ionic surfactants (e.g., Pluronic P123) with graphene sheets.
Figure 1B:
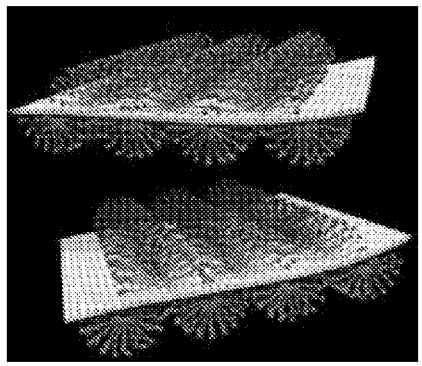
Figure 1C:
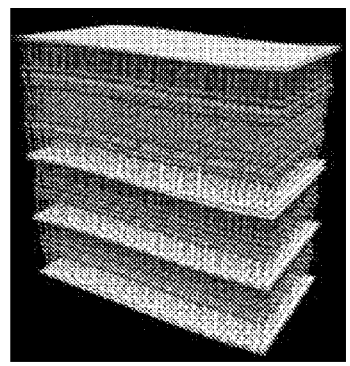
Figure 1E:
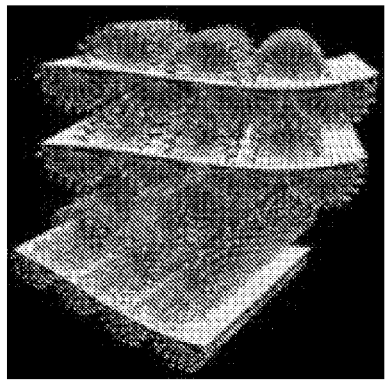
Figure 1D:
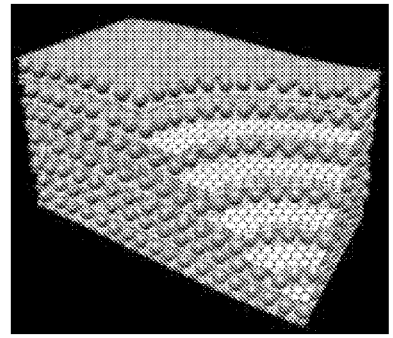
Figure 2A:
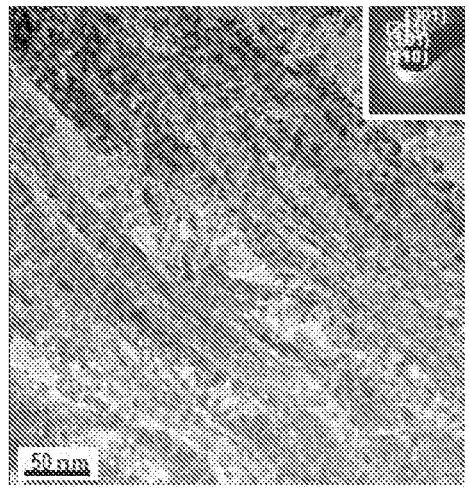
FIG. 2(A) to (E) are TEM images of calcined $SnO_2$-graphene (15 wt % graphene) nanocomposite powder. 2(F) to (H) are TEM images of the NiO-graphene nanocomposite powder. 2(A) is a bright-field cross-sectional TEM image of the $SnO_2$-graphene nanocomposite powder showing layered structures. The inset is the corresponding SAED pattern. The ring pattern of diffraction shows polycrystalline cassiterite $SnO_2$. The right symmetrical diffraction spots located at (110) ring corresponds to (001) diffraction of oriented multilayer graphene sheets. 2(B) is a dark-field TEM image obtained from (211) diffraction ring of $SnO_2$. 2(C) is a dark-field TEM image obtained from the bright (001) diffraction spots of graphene sheets. 2(D) is a high-magnification TEM of $SnO_2$-graphene nanocomposites in 2(A). The layered structure of $SnO_2$ is composed of connected nanocrystalline $SnO_2$ with a 4-5 nm diameter interspaced by graphene layers. 2(E) is a high-resolution TEM image of the layered superstructure of $SnO_2$-graphene nanocomposites in 2(D). Lattice fringes of 0.33 nm corresponding to (110) plane of $SnO_2$ and lattice fringes of 0.34 nm corresponding to (001) of multilayer graphene sheets are marked in each layer. 2(F) is a bright-field cross-sectional TEM image of the NiO-graphene nanocomposite (40 wt % graphene) showing nanocrystalline NiO layers (approximately layer thickness of 4 nm) interspaced by graphene layers. The inset is the corresponding SAED pattern showing polycrystalline NiO. 2(G) is a high resolution TEM image of NiO-graphene nanocomposite showing the graphene sheets between NiO layers. Lattice fringes of 0.33 nm corresponding to (001) of multilayer graphene sheets are marked. (H) High resolution TEM image of NiO-graphene nanocomposite showing the lattice fringes of NiO along [110] direction. Lattice fringes of 0.24 nm corresponding to (111) planes in NiO are marked.
Figure 2B:
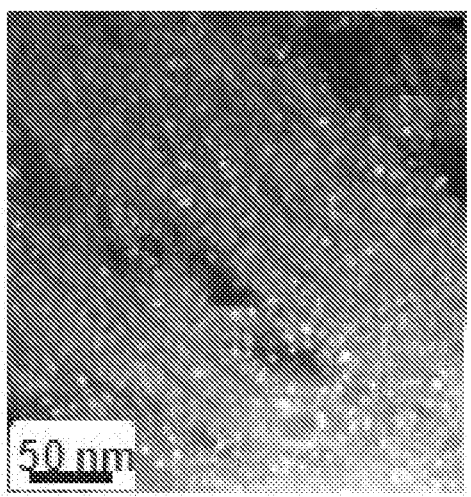
Figure 2C:
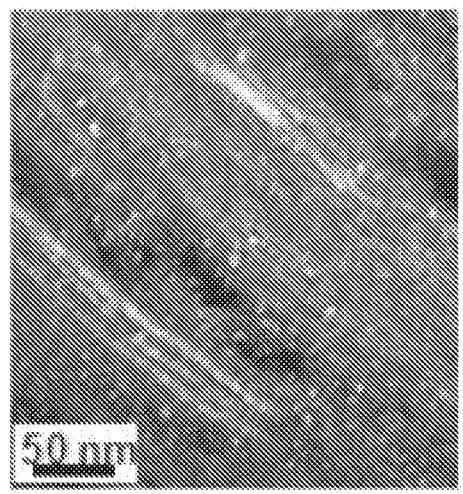
Figure 2D:
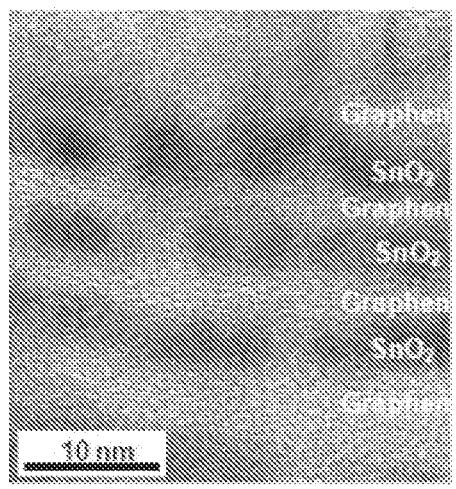
Figure 2E:
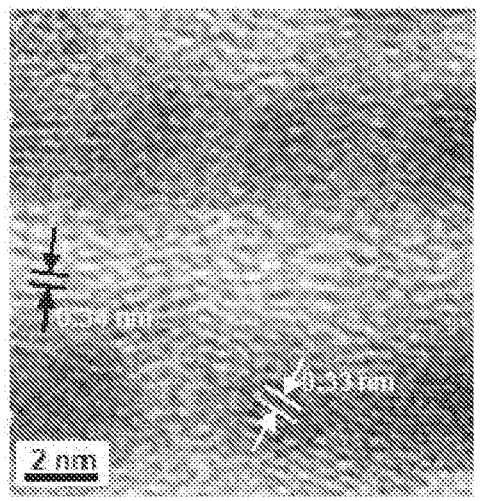
Figure 2F:
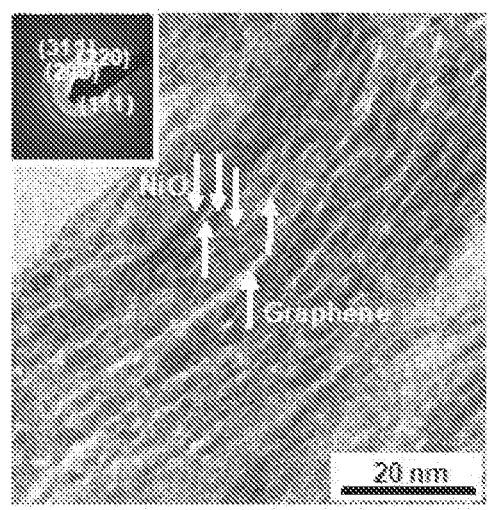
Figure 2G:
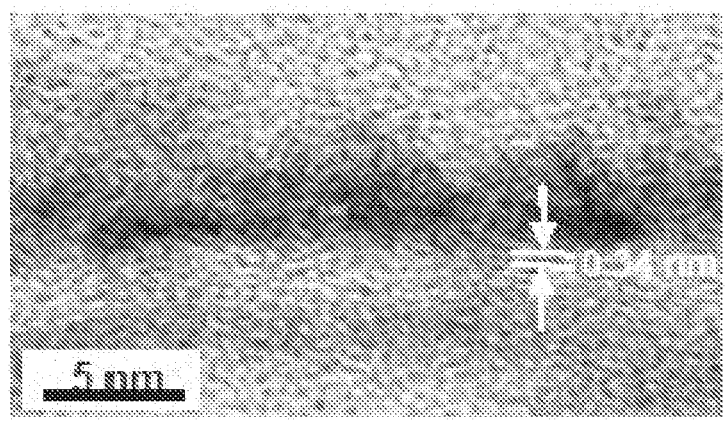
Figure 2H:
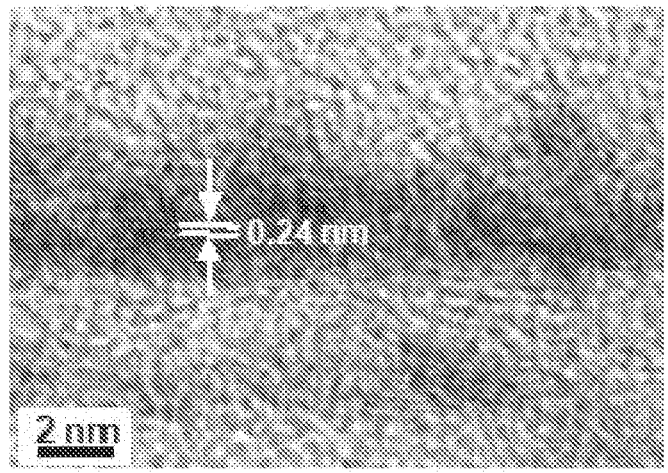

For the purposes of promoting an understanding of the principles of the invention, reference will now be made to the embodiments illustrated in the drawings and specific language will be used to describe the same. It will nevertheless be understood that no limitations of the inventive scope is thereby intended, as the scope of this invention should be evaluated with reference to the claims appended hereto. Alterations and further modifications in the illustrated devices, and such further applications of the principles of the invention as illustrated herein are contemplated as would normally occur to one skilled in the art to which the invention relates.

A series of experiments were conducted to demonstrate certain embodiments of the present invention. The experimental design is as follows.

Synthesis of $SnO_2$-Graphene Nanocomposites

In a typical preparation of $SnO_2$-graphene nanocomposite (e.g., 28 wt % graphene), 71.3 mg of graphene sheets and 12.2 mL of sodium 1-dodecanesulfonate aqueous solution (20 mg/mL, 60° C.) were mixed together. The mixture was diluted by de-ionized $H_2O$ to 30 mL and sonicated for 10-15 min (BRANSON SONIFER S-450A, 400W). 10 mL of 0.1 M $SnCl_2$ in 3.8 wt % HCl solution was added into as-prepared graphene-surfactant dispersions while stirring. Then, 4.8 mL of 1M urea was added dropwise under vigorous stirring followed by addition of 4 mL of $H_2O_2$ solution (1 wt %). Finally, deionized $H_2O$ was added under vigorous stirring until reaching a total volume of 100 mL. For preparation of $SnO_2$-graphene nanocomposites (40 wt % graphene), 120 mg of graphene sheets and 16.3 mL of sodium 1-dodecanesulfonate aqueous solution were used following the same procedure. The resulting mixture was further stirred in a sealed polypropylene flask at 90° C. for 16 h.

Synthesis of NiO-Graphene Nanocomposites

In a typical preparation of NiO-graphene nanocomposite materials (e.g., 30 wt % graphene), 13 mg of graphene sheets and 1.5 mL of sodium dodecyl sulfate solution (0.5 M) were mixed together. The mixture was diluted by 20 mL of de-ionized $H_2O$ and sonicated for 10-15 min (BRANSON SONIFER S-450A, 400W). Then, 4.06 mL of 0.1M $Ni(NO_3)_2$ solution was added dropwise under vigorous stirring followed by addition of 7.29 mL urea solution (0.1 g/L) and 30 mL of de-ionized $H_2O$. The resulting mixture was further stirred in a sealed polypropylene flask at 90° C. for 16 h. $SnO_2$-graphene and NiO-graphene nanocomposite precipitates were separated by centrifugation followed by washing with de-ionized $H_2O$ and ethanol. The centrifuge and washing processes were repeated three times. The obtained black powder of $SnO_2$-graphene and NiO-graphene nanocomposites were then dried in a vacuum oven at 70° C. overnight and subsequently calcined in static air at 400 C for 2 h and in 2.7% $H_2$/Ar gas at 400 C for 3 h, respectively.

Synthesis of $MnO_2$-Graphene Nanocomposites

In a typical preparation of $MnO_2$-graphene nanocomposite materials (e.g., 60 wt % graphene), 5 mg of graphene sheets and 2.5 mL of sodium dodecyl sulfate solution (0.5 M) were mixed together. The mixture was diluted by 20 mL of de-ionized $H_2O$ and sonicated for 10-15 min (BRANSON SONIFER S-450A, 400W). 6 mg of $KMnO_4$ was dissolved in 10 mL of 0.1M $Na_2SO_4$ solution. Then the solution was added dropwise to the surfactant-graphene dispersion under vigorous stirring for 3 h. $MnO_2$-graphene nanocomposites were obtained by filtration followed by washing with de-ionized $H_2O$ three times. The nanocomposite sample was dried under vacuum overnight followed by heat treatment in atmosphere of 2.7% $H_2$/Ar gas at 400 C for 3 h.

Fabrication of Metal Oxide-Graphene Nanocomposite Paper Electrodes

Similar to processes of making graphene oxides and graphene papers, vacuum filtration of as synthesized $SnO_2$-graphene (40 wt % graphene), NiO-graphene (30 wt % graphene) and $MnO_2$-graphene (60 wt % graphene) nanocomposite solution using Anodisc membrane filters yielded, followed by washing and drying, a free standing metal oxide-graphene nanocomposite paper with thickness ranging from 5 to 20 μm. The metal oxide-graphene nanocomposite papers were then sandwiched between graphite plates and heat treated in an atmosphere of 2.7% $H_2$/Ar gas at 400 C for 3 h.

Synthesis of Mesoporous $SiO_2$-Graphene Nanocomposites 0.125 g of poly(ethylene glycol)-b-poly(propylene glycol)-b-poly(ethylene glycol) triblock copolymer (Pluronic P123, $EO_{20}PO_{70}EO_{20}$, Sigma-Aldrich, USA), 0.5 mL of tetraethyl orthosilicate (TEOS, Sigma-Aldrich), and 0.4 g of 0.1M HCl were dissolved in 5 mL ethanol. The sol was stirred for 30 min. 0.01 g of graphene sheets was added into the sol followed by vigorous stirring for 15 min. The mixture was dropwise added to a membrane filter under vacuum. The obtained black powders were dried overnight followed by calcination in static air at 400° C. for 2 h. The weight percentage of SiO2 was estimated by TGA measurement.

Characterization

XRD patterns were obtained on a Philips Xpert X-ray diffractometer using Cu Kα radiation at λ=1.54 Å. The metal oxide-graphene nanocomposite samples were embedded in resin (LR White Resin, Electron Microscopy Sciences) followed by aging at 60° C. for 20 h. The embedded samples were cross-sectioned by ultramicrotome for TEM studies. The TEM investigation was performed on a JEOL JSM-2010 TEM operated at 200 kV. SEM images were obtained on an FEI Helios Nanolab dual-beam focused ion beam/scanning electron microscope (FIB/SEM) operated at 2 kV.

The Li-ion battery electrochemical evaluations were carried out using half-cell using 2325 coin cells (National Research Council, Canada). Li foil was used as counter and reference electrode. The heat treated $SnO_2$-graphene nanocomposite paper electrode (40 wt % graphene) was directly used as working electrode without additional electrode preparation. The electrolyte used was 1M $LiPF_6$ in ethyl carbonate/dimethyl carbonate (volume ratio 1:1). For preparation of control electrodes using $SnO_2$-graphene nanocomposite powder (28 wt %graphene) and control $SnO_2$ powder, a mixture of the active materials, Super P and poly(vinylidene fluoride) (PVDF) binder were dispersed in N-methylpyrrolidone (NMP) solution in a weight ratio of 70:20:10 and 50:40:10, respectively. After stirring overnight the slurry was then coated on the copper foil current collector and dried overnight in air. The coil cells were assembled in an argon-filled glove box. The performance of the $SnO_2$-graphene nanocomposite paper electrode and the control electrodes were evaluated using Arbin Inst. (College Station, Tex.) at room temperature. The cells were tested between 0.02 V and 1.5 V versus Li metal at various current densities. The specific capacity was calculated based on $SnO_2$ weight.

The electrochemical capacitor performance of graphene sheets and mesoporous $SiO_2$ graphene nanocomposites were analyzed with CHI 660c electrochemical workstation (CHI Instruments Inc, Austin, Tex.). All experiments were carried out with a conventional three-electrode configuration in a beaker-type cell. To prepare the working electrode, 5 mg of graphene sheets and mesoporous silica/graphene nanocomposite powder was dispersed in 1 mL of dimethyl formamide or 1 mL of $H_2O$, respectively. The mixture was sonicated for 5 min. 5 μL of the solution was deposited on glassy carbon electrode and dried in air. 5 μL of a 5% Nafion solution was dropped on the top of the electrode to prevent the loss of the composite material. A platinum wire and an Ag/AgCl electrode were used as the counter and reference electrodes, respectively. The electrolyte was 1M $Na_2SO_4$ aqueous solution. The specific capacitance was calculated from cyclic voltammograms according to C=I/(m×scan rate), where I represents average current in either positive or negative scan, and m is the mass of single electrode. The real capacitor would operate with a capacitance one-fourth that of the single electrode due to the series connection of two electrodes in real capacitors.

In these experiments, a multiphase self-assembly approach is used to form well-controlled, three-dimensional nanocomposite materials for energy storage from extended nanostructured building blocks. Two-dimensional graphene layers, or sheets, were used as the macromolecular template for the absorption and cooperative assembly of surfactant micelles and metal oxide precursors. As shown in these experiments, the surfactant, metal oxide, and graphene sheets self-assemble into ordered three-dimensional superstructures. The use of these nanocomposite materials for advanced energy storage was then demonstrated. In Li-ion batteries, $SnO_2$-graphene nanocomposites of the present invention achieved near theoretical specific energy density without significant charge-discharge degradation for Li-ion battery applications. Mesoporous $SiO_2$-graphene nanocomposites of the present invention showed high specific capacitance for electrical double layer supercapacitors.

In contrast to synthetic approaches, nature has the ability to form nanocomposites with well-controlled architecture from multiscale and multifunctional building blocks. For example, mollusk shells grow distinctive nacreous laminated composites with aragonite nanoplates and organic films between the plates. Coccolith and magnetosom assemble highly organized hierarchical structures from nano- and microcrystalline building blocks. Although in synthetic materials both two-dimensional and three-dimensional molecular templates have been investigated to prepare oriented ceramic thin films, single phase mesostructured inorganics, polymers/surfactants and nanoparticle nanocomposites, self-assembly from multilength and multiphase building blocks has not been successfully demonstrated.

In these experiments, a multiphase self-assembly strategy using both traditional molecular precursors and extended two-dimensional nanosheets as the fundamental building blocks was demonstrated. The formation of complex, self-assembled mesostructures supported on graphite and other substrates has previously been shown. These studies provide some clue for the strategy used to construct three-dimensional, bulk materials. The basic concept is that instead of a graphite substrate, these experiments use two-dimensional nanosheets (graphene) as the macromolecular template for the cooperative absorption and assembly of surfactants and metal oxides on the graphene surface. At the same time, the extended graphene sheets participate in the self-assembly of the surfactant and metal oxide to form ordered three-dimensional superstructures, thus becoming a critical functional component of the nanocomposite materials, as shown in FIG. 1.

Graphene is chosen as a model material because of the high electronic conductivity and good mechanical properties. These experiments used functionalized graphene sheets (FGSs) prepared by thermal expansion process of exfoliated graphene oxide. The surfactant first absorbs to the graphene surfaces as hemimicelles to ensure that the graphene nanosheets are dispersed in the hydrophobic domains of the surfactant micelles. The anionic surfactant simultaneously binds to positively charged metal anions and self-assembles with the graphene to form an ordered lamella mesophase. Subsequently, the metal oxides are crystallized between the graphene, producing a new class of nanocomposites in which alternating layers of graphene sheets and metal oxide nanocrystals are assembled into a layered superstructures.

These experiments focus on the nanocomposites made of metal oxides (e.g., $SnO_2$, NiO, and $MnO_2$ etc) that are good candidates for electrochemical energy storage. However, as will be recognized by those having ordinary skill in the art and the benefit of this disclosure, other metal oxides could also be used. One challenge that these experiments overcome is the low conductivity of such materials, which usually requires the addition of a conductive phase to enhance their electron and ion transport. Another challenge that these experiments overcome is the instability of these anode materials upon lithiation (alloying).

For example, when used in Li-ion batteries, $SnO_2$ is a promising high capacity anode material, but has a large volume expansion upon lithiation, causing degradation and rapid fading during charge/discharge cycles.

Figure 3:
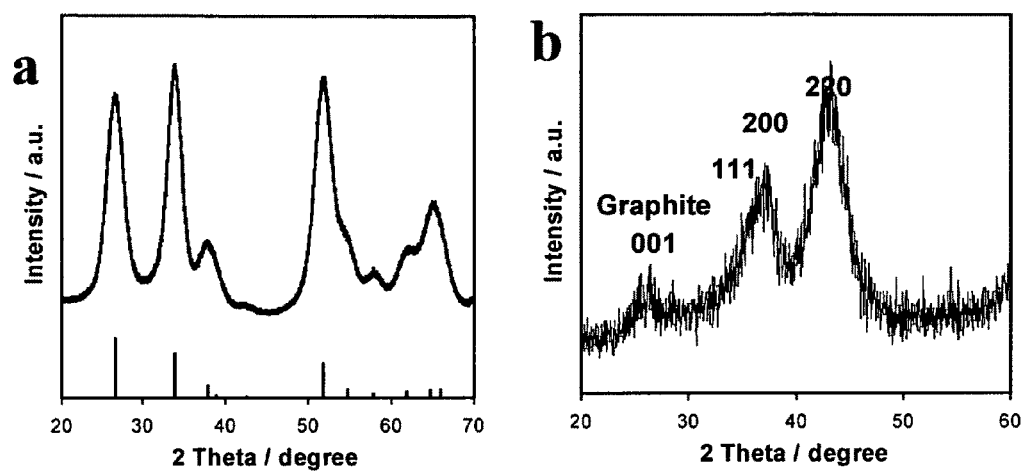
FIG. 3 (b) is the XRD pattern of the NiO-graphene nanocomposite paper showing reflection peaks of (111), (200) and (220) of crystalline NiO, as well as (001) reflection peak of multilayer graphene sheets.
Figure 4A:
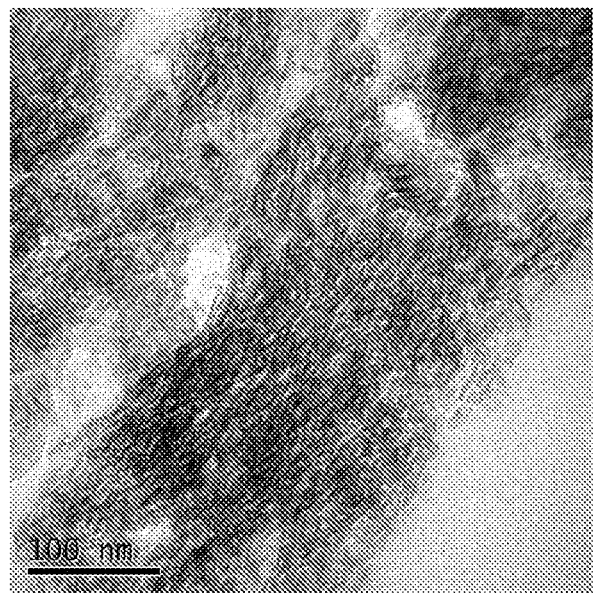
FIG. 4(a) is the cross-sectional TEM image of $MnO_2$-graphene nanocomposite paper showing layered structures.
Figure 4B:
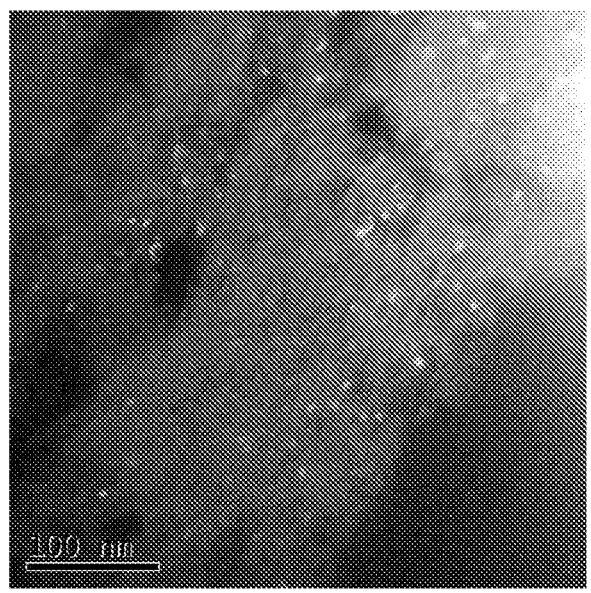
FIG. 4(b) is the corresponding dark-field TEM image of FIG. 4(a) showing isolated crystalline nanoparticles, indicating amorphous $MnO_2$ layers coated the graphene surface.

FIG. 2 shows the Transmission electron microscopy (TEM) results of the superstructures of alternating nanometer-thick layers of nanocrystalline metal oxides and graphene sheets in $SnO_2$-graphene and NiO-graphene nanocomposites prepared in the powder form. Cross-sectional TEM image of the calcined $SnO_2$-graphene nanocomposite prepared clearly shows the regular layers, as shown in FIG. 2A. Each layer is about 3 to 5 nm thick and is rather uniform. A selected area electron diffraction (SAED, inset in FIG. 2A) pattern suggests a typical crystal structure of cassiterite $SnO_2$ (JCPDS No. 000-0024), which is consistent with the X-ray diffraction (XRD) result shown in FIG. 3. The corresponding dark-field image from the (211) reflection of $SnO_2$ shown in FIG. 2(b) confirms that the $SnO_2$ layer is made up of 4-nm nanocrystals. Two symmetrical but diffuse diffraction spots are also observed on top of the (110) diffraction ring of the $SnO_2$, which are attributed to the (001) reflection of the oriented multilayer graphene sheets. The dark-field image shown in FIG. 2(c) from the (001) reflection of the graphene sheets indeed reveals band structures of the multilayer graphene sheets separated by $SnO_2$. A high-magnification TEM image shown in FIG. 2(d) reveals that the $SnO_2$ nanoparticles are connected to one another within the layer but separated from layer to layer by graphene sheets. Lattice fringes of both the (110) plane in 4-nm-diameter nanocrystalline $SnO_2$ and the (001) plane in multilayer graphene sheets are observed in high-resolution TEM image as shown in FIG. 2(e). Similarly, layered superstructures with alternating layers of metal oxide and graphene sheets are also observed in NiO-graphene, as shown in FIG. 2(f) and $MnO_2$-graphene nanocomposites as shown in FIG. 4. Lattice fringes of the (001) plane in multilayer graphene sheets and the (111) plane in 5-nm thick nanocrystalline NiO layer are observed in high-resolution TEM images as shown in FIGS. 2(g) and 2(h).

Figure 5A:
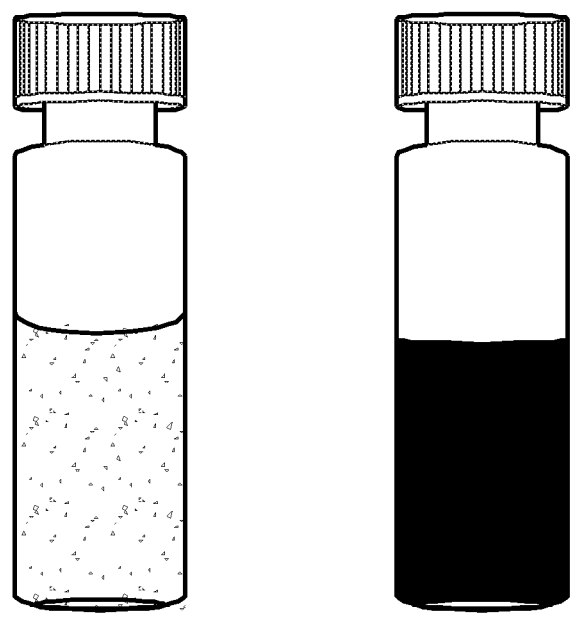
FIG. 5(a) is a photograph of a FGS aqueous dispersion (left) and FGS aqueous dispersion using sodium dodecyl sulfate (SDS) surfactant (right)
Figure 5B:
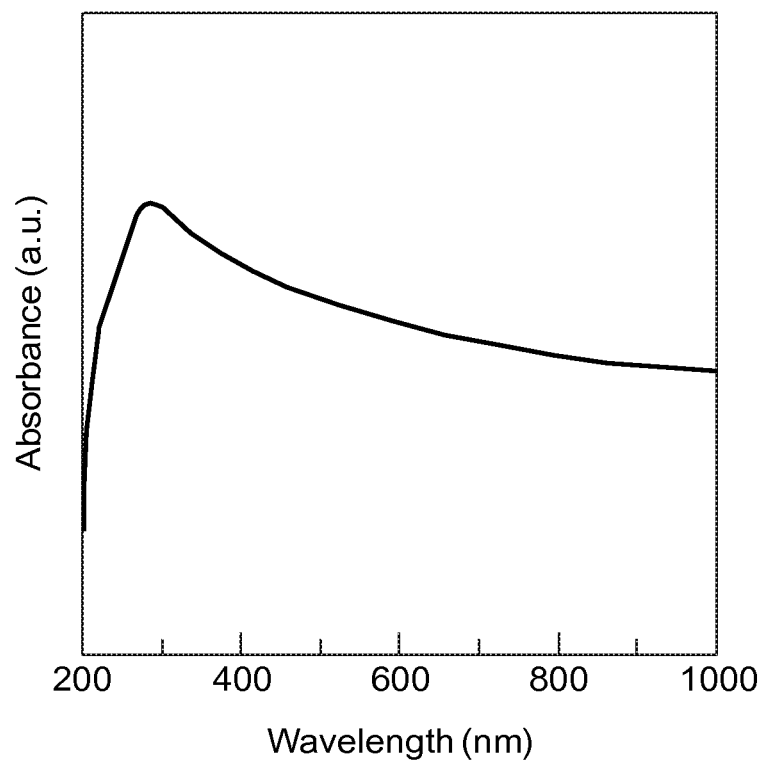
FIG. 5(b) is a graph showing the UV-Vis absorbance of the SDS-FGS aqueous dispersion. The use of the surfactant sodium 1-dodecanesulfonate in dispersing FGSs in aqueous solution obtains similar results.
Figure 6A:
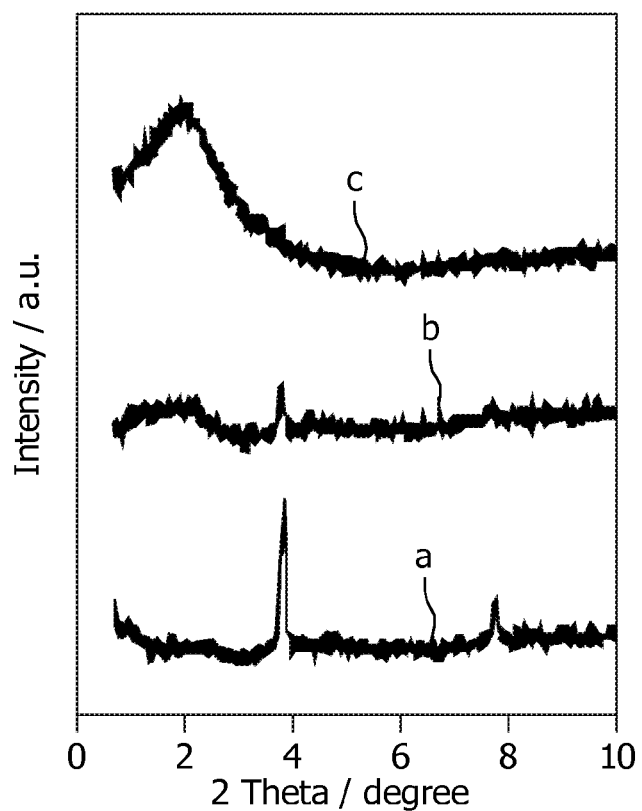
FIG. 6(A) is a low angle XRD pattern of the anionic surfactant-$SnO_2$-graphene precipitates after reaction time of 1 hr (a), 11 hr (b) and 16 hr (c). Lamellar mesophase with (001) d-spacing of 2.3 nm is observed in the mixture.

The unique superstructure in the nanocomposites is a direct result of the cooperative self-assembly involving the surfactant, the metal oxide, and nanophase building blocks of graphene sheets. Both experimental and theoretical studies suggested that anionic surfactant molecules absorbed on a graphite surface form tubular, hemicylindrical micelle aggregates. Thus, the anionic surfactant can disperse the FGSs in the hydrophobic domains of the surfactant micelles to form a well-dispersed FGS solution, as shown in FIG. 5. However, when the metal oxide precursor (e.g., $SnO_2$ precursor) is added to the solution, a black precipitate was obtained with a lamellar mesostructure as revealed by the XRD pattern, as shown in FIG. 6(a). Such a transition from rod-like micelles to lamella structures is caused by the binding of the metal cations with the anionic surfactant head groups which reduces the net charge and the effective head group size, favoring formation of the lamellar mesophase. In addition, the graphene surface might have provided a substrate effect that promotes and stabilizes the lamellar mesophase. Examples of this effect include lamellar mesostructured film on a substrate using SDS as a structural directing agent by evaporation-induced self-assembly or electrochemical deposition.

Figure 6B:
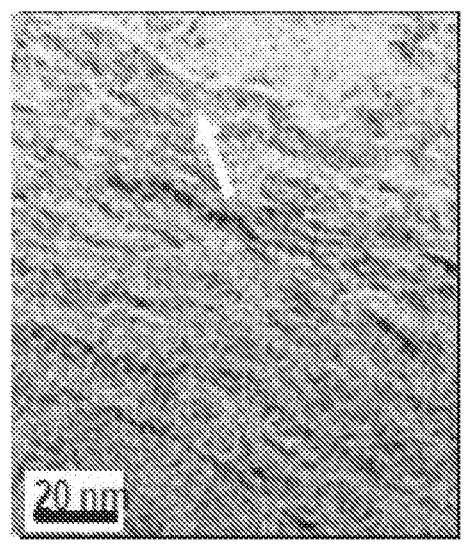
FIG. 6 (B) is a cross-section TEM image of anionic surfactant-$SnO_2$-graphene precipitates after reaction time of 11 hr. Lamellar mesophase with layer distance of 2.4 nm is marked.
Figure 6C:
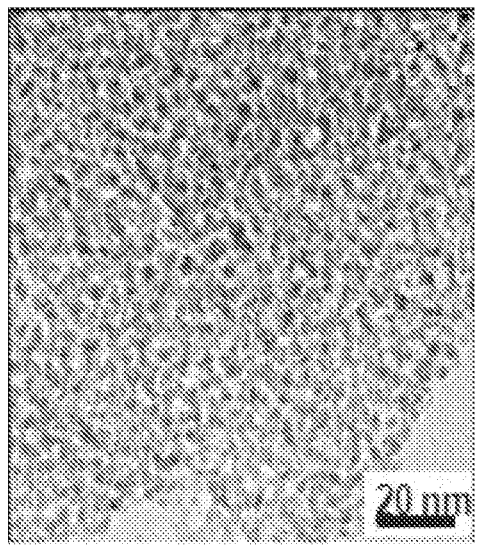

After formation of the lamellar mesophase, the hydrophobic graphene should still be located in the hydrophobic domain of the lamellar mesophase. Further reaction causes crystallization of $SnO_2$ between the graphene sheets and leads to degradation of the long-range ordering of the lamellar mesophase as shown in FIG. 6(a), but the overall lamellar mesostructures can be still observed in the TEM image as shown in FIG. 6(b) with an adjacent layer distance of 2.4 nm, consistent with the (001) d-spacing (2.3 nm) observed in the XRD pattern. Finally, calcination results in the decomposition and removal of the surfactants and further growth of $SnO_2$ nanocrystals forming an interconnected nanocrystalline $SnO_2$ layer between the graphene sheets. As a comparison, only worm-like nanoporous structures are produced in absence of graphene as shown in FIG. 6(c).

Several layers of graphene sheets are observed between nanocrystalline metal oxide layers. Such multilayers are most likely caused by restacking of graphene due to van der Waals force during reaction, which is a common phenomenon even in the presence of the anionic sulfate surfactant. It is also possible that some of the restacked graphene sheets in the $SnO_2$-graphene nanocomposites come directly from FGS samples that have not been fully exfoliated. Thus, while the inventors are not certain of the exact mechanism that holds the metal oxide to the graphene layer, it is reasonably suspected to be Van Der Waals forces. However, the invention should not be considered as limited to such arrangements. Accordingly, as used herein the term "bonded" should be understood to include any forces that effectively hold the two materials adjacent to one and another.

Figure 6D:
Figure 6E:
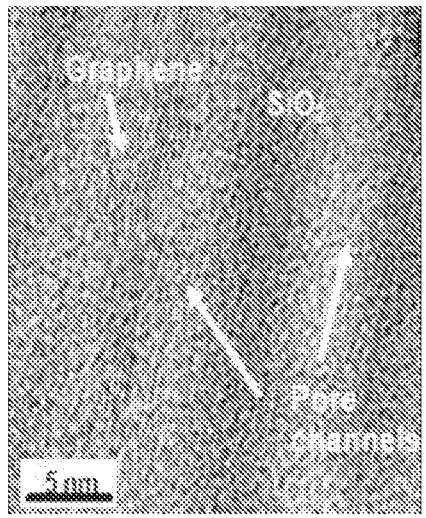

An example of nanocomposites made of graphene and hexagonal mesoporous silica is shown in FIGS. 6(d) and 6(e). In this example, a block co-polymer, i.e., Pluronic P123, is used to assist self-assembly of silica on a graphene surface. The nonionic surfactant can adsorb to the graphene surfaces into hemimicelles. However with this surfactant and silica the hexagonal mesophase is more favorable, resulting in a three-dimensional interconnected network of mesoporus silica and graphene sheets.

Figure 7A:
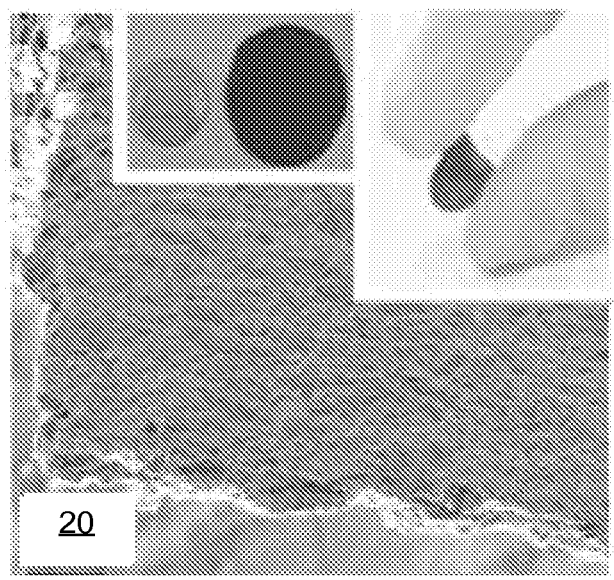
FIG. 7 (A) is a side-view SEM image of a self-assembled free-standing $SnO_2$-graphene nanocomposite (40 wt % graphene) electrode 15-μm thick. Photographs in the inset show a disk-like 3-cm-diameter $SnO_2$-graphene nanocomposite paper electrode on the left and a bent paper electrode on the right.
Figure 7B:
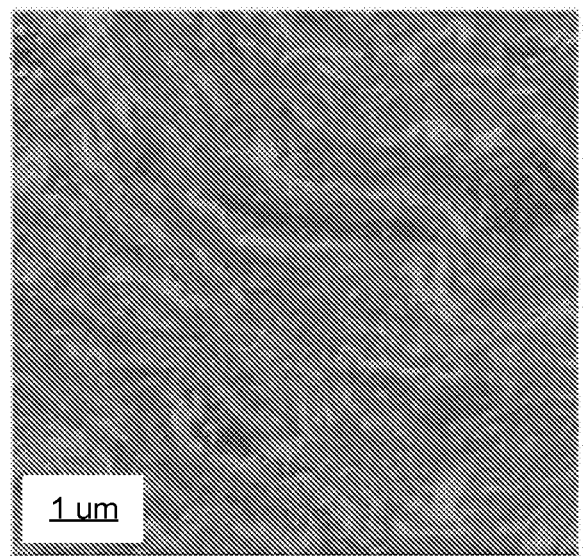
Figure 8A:
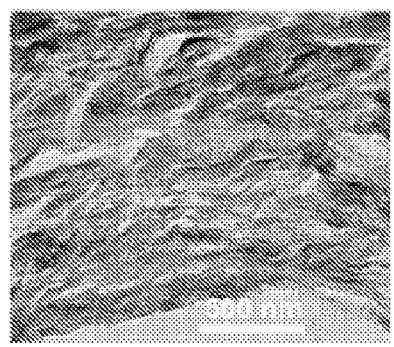
FIGS. 8 (a,b,c) are cross-sectional TEM images of the $SnO_2$-graphene nanocomposite paper.
Figure 8B:
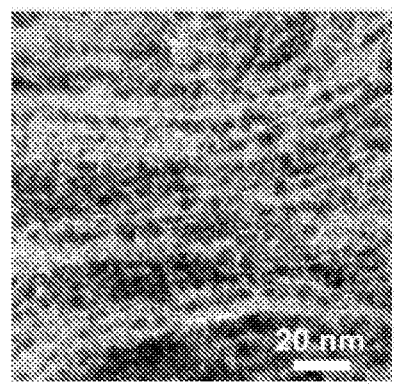
Figure 8C:
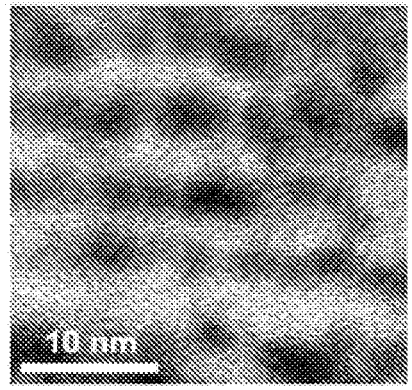

These experiments then investigated the charge-discharge properties of $SnO_2$-graphene nanocomposite as the anode for Li-ion batteries. Instead of using the as-prepared powders, the experiments assembled free-standing flexible electrodes in one step without using a binder or current collector. This approach has the potential to directly fabricate energy storage devices through self-assembly. A SEM image of the free-standing $SnO_2$-graphene nanocomposite electrode, about 15-μm thick, is shown in FIG. 7(a). The $SnO_2$-graphene nanocomposite electrode in the form of a disk with a diameter of 30 mm is robust and fairly flexible, as shown in the inset of FIG. 7(a). A polished cross-sectional SEM image shown in FIG. 7(b) reveals typical parallel, wavy layer architectures. A cross-sectional TEM image of the $SnO_2$-graphene electrode shown in FIG. 8 shows similar layered superstructures with alternating layers of nanocrystalline $SnO_2$ and graphene sheets, as for that in powders, as shown in FIG. 2(a)-FIG. 2(e).

Figure 7C:
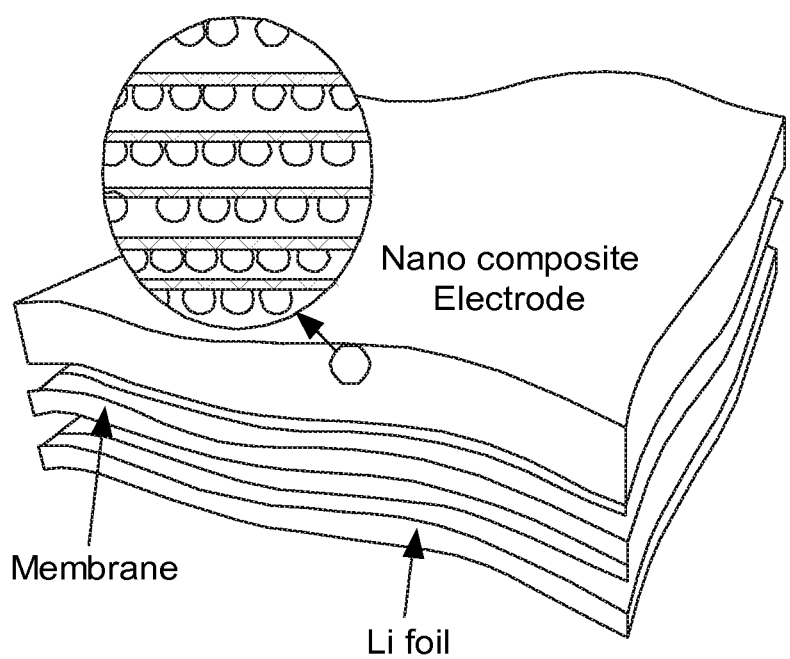

The free standing $SnO_2$-graphene nanocomposite electrodes were further studied using a half cell design. The coin cell contains a Li metal foil and a separator film of Celgard 2400 saturated with 1M $LiPF_6$ in ethylene carbonate and dimethyl carbonate (1:1 by volume), as shown in FIG. 7(c).

Figure 7D:
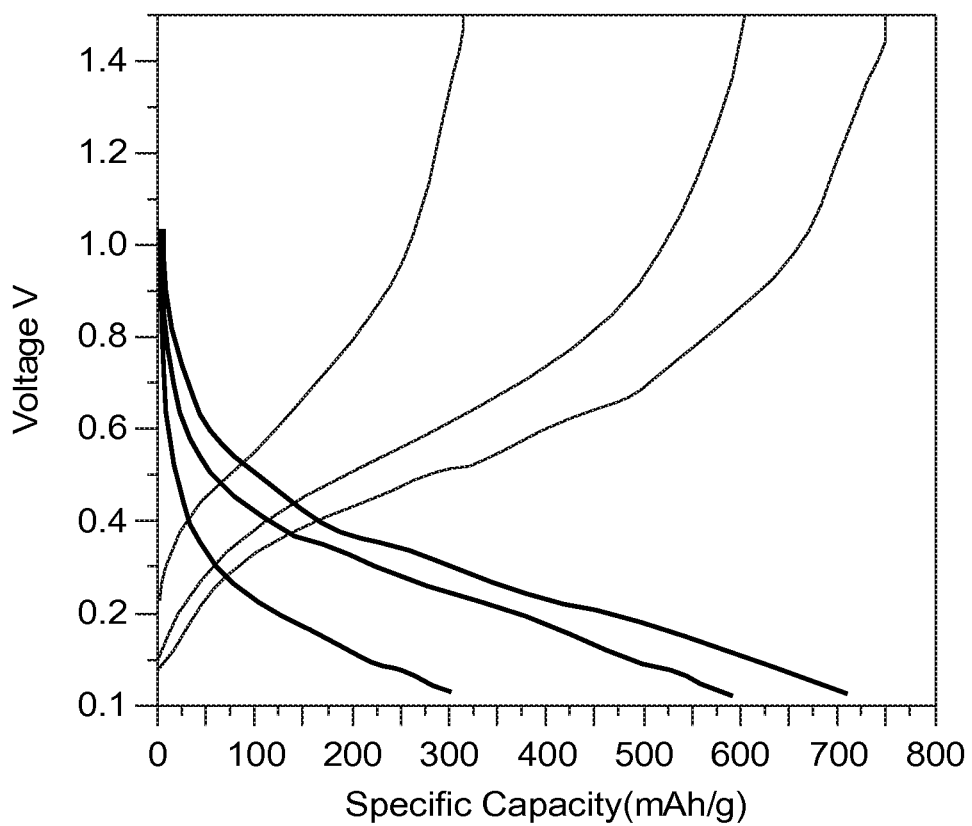
Figure 9:
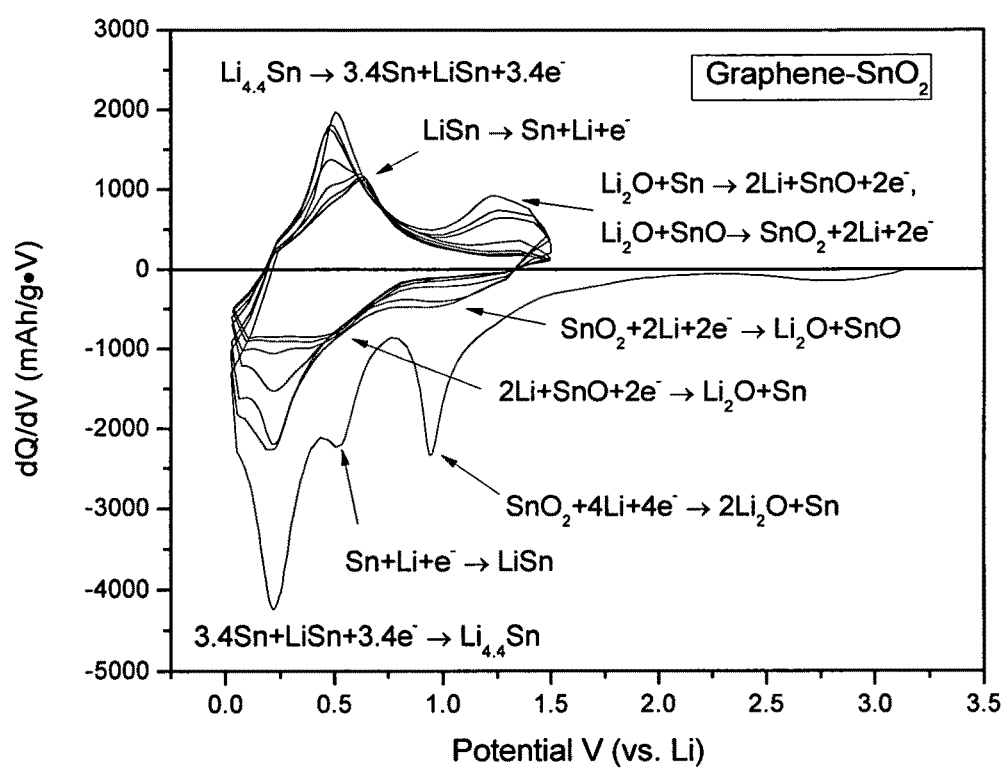
FIG. 9 is a graph showing dQ/dV vs. potential plot of lithiated/de-lithiated $SnO_2$-graphene nancomposites.

The voltage-capacity profiles of the SnO$_2$-graphene nanocomposite electrode at different current density are shown in FIG. 7(d). SnO$_2$ is converted into metallic Sn in the first charge/discharge cycle, as confirmed from differential charge/discharge curves of SnO$_2$-graphene nanocomposite electrode. In the subsequent charge/discharge cycles, Li ions were reversibly inserted into Sn as Li/Sn alloys (LiSn or Li$_{4.4}$Sn) as shown in FIG. 9. Pure graphene tested within the same voltage range at current density of 0.004 A/g has a steady capacity of 120 mAh/g. At 40 wt % graphene in the nanocmposites, the capacity from graphene is less than 10% of the total capacity in the SnO$_2$-graphene electrode. The overall capacity of the electrode is mostly from the SnO$_2$ active phase.

Figure 7E:
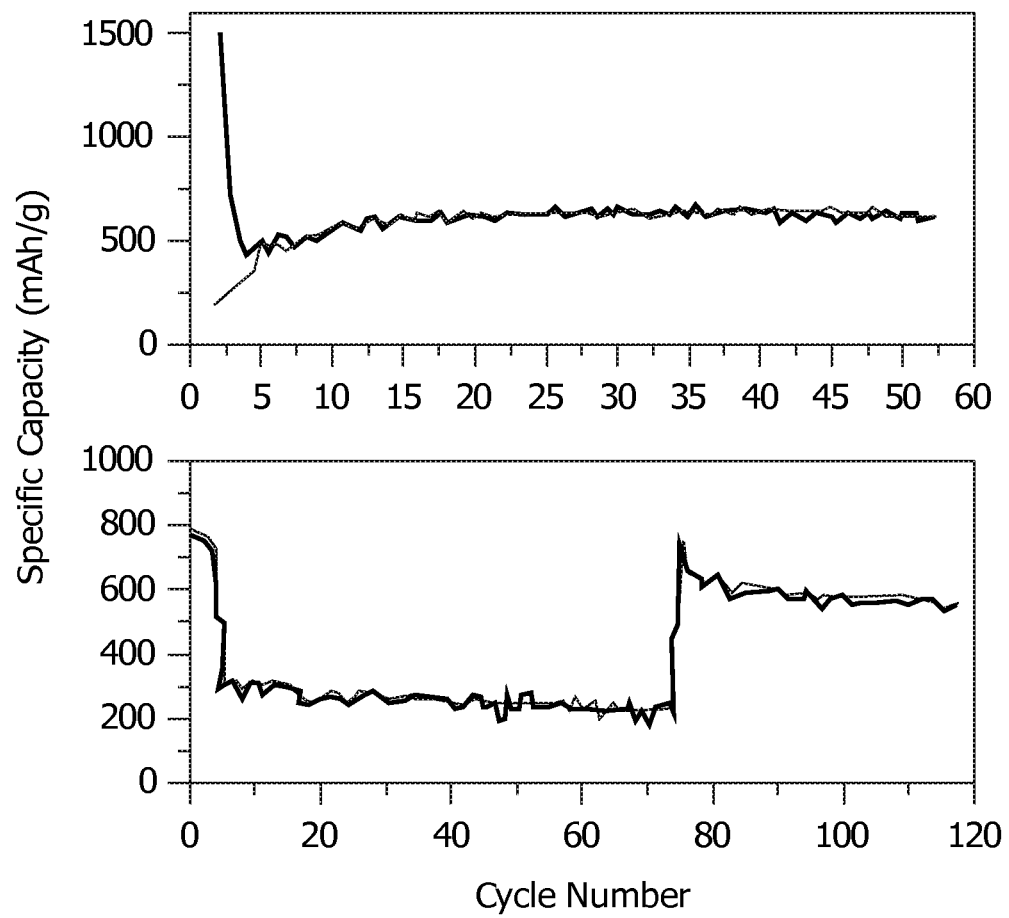
Figure 10:
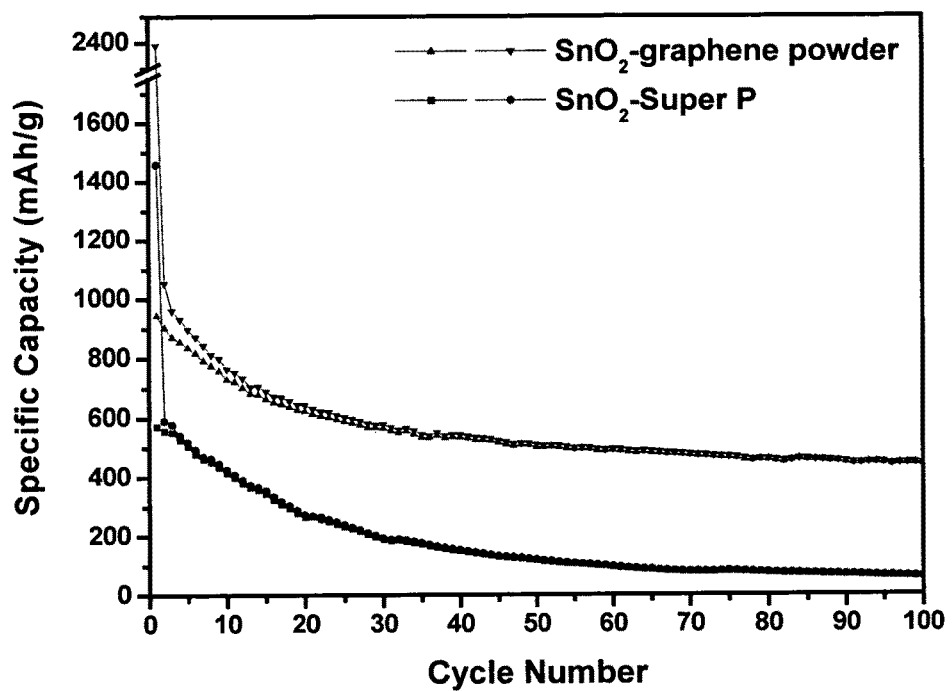
FIG. 10 is a graph showing the specific capacity of $SnO_2$ as a function of charge-discharge cycles in $SnO_2$-graphene nanocomposite powder (15 wt % graphene) and $SnO_2$-Super P (40 wt %) at current density of 0.2 A/g.

The specific capacity of the SnO$_2$ in the nanocomposite paper as a function of cycle number is shown in FIG. 7(e). The discharge capacity drop in 1$^{st}$ cycle is attributed to irreversible conversion of SnO$_2$ to Sn and Li$_2$O upon lithiation. The increase in specific capacity during the initial 10 cycles is attributed to improvement in electrolyte wetting of dense SnO$_2$-graphene nanocomposite electrode and the conversion of SnO$_2$ to Sn occurring upon initial lithiation. As the electrode is well wetted by the electrolyte, a steady specific capacity of 625 mAh/g is obtained at a current density of 0.02 Ng (as shown in FIG. 7(e), top). Significantly, the SnO$_2$-graphene nanocomposite electrode shows excellent capacity retention over the charge-discharge cycles in contrast to the rapid degradation of the control SnO$_2$-Super P electrode, SnO$_2$-graphene powder electrode as shown in FIG. 10, and typical SnO$_2$ electrode materials. A steady specific capacity of 760 mAh/g for the nanocomposite paper can be obtained at a current density of 0.008 Ng (shown in FIG. 7(e), bottom), close to the theoretical capacity (780 mAh/g). The specific capacities of 225 mAh/g and 550 mAh/g are obtained at a current density of 0.08 Ng and 0.02 A/g (shown in FIG. 7(e), bottom), respectively. At all the charge rates, the specific capacity in nanocomposite papers is well retained during cycling at different rates. The higher capacity and better stability in the nanocomposite electrodes are attributed to good contact between the nanocrystalline SnO$_2$ and sandwiched graphene even after conversion and volume change upon lithiation.

Figure 7F:
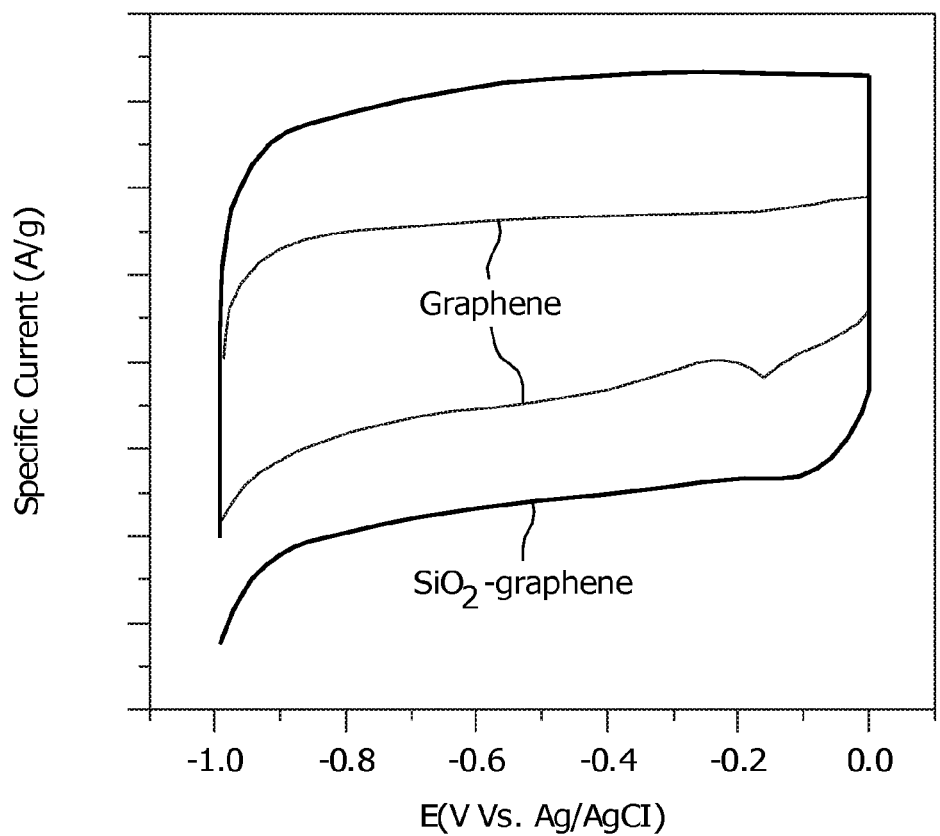

High surface area conductive materials with tailored porosity are useful in other energy storage devices such as electrical double layer supercapacitors. These experiments performed a preliminary study on the electrochemical capacitance of the mesoporous SiO$_2$-graphene nanocomposite powder. FIG. 7(f) shows cyclic voltammograms (CV) using a three-electrode configuration for pure graphene and a mesoporous SiO$_2$-graphene nanocomposite. Both graphene and the SiO$_2$-graphene nanocomposite display a capacitive charging current with a rectangular shape across the potential range between –1.0 and 0 V (vs. the saturated Ag/AgCl reference electrode). However, surprisingly the CV response for the nanocompiste with the "inert" silica is significantly enhanced, resulting in a much higher single electrode capacitance of 120 F/g. This value is better than the best result reported in the literature for graphene (about 100 F/g), but the actual specific capacitance for graphene in the nanocomposite is higher (170 F/g) if accounting for the 30 wt % of inert silica. These preliminary studies suggest the improved electrochemical response in the nanocomposites is likely attributed to the open mesoporous network, which prevents aggregation of the graphene sheets on the electrode.

Graphene sheets used in this study were prepared through the thermal expansion of graphite oxide. X-ray photoemission spectroscopy (XPS) of the graphene sheets shows a sharp C1s peak indicating good sp$_2$ conjugation.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with an electric device or fluid processing unit, it should be understood to comprehend singular or plural and one or more signal channels or fluid lines as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

The invention claimed is:

1. A nanocomposite material comprising at least two layers, each layer including a metal oxide layer directly bonded to a graphene layer, wherein the graphene layer has a thickness of from about 0.5 nm to 50 nm, and the metal oxide layers and graphene layers are alternatingly positioned in the at least two layers and bonded to one another in a stacked configuration.

2. The nanocomposite material of claim 1 wherein said metal oxide is M$_x$O$_y$, and where M is selected from the group consisting of Ti, Sn, Ni, Mn, Si, V and combinations thereof.

3. The nanocomposite material of claim 1 wherein said metal oxide is tin oxide.

4. The nanocomposite material of claim 1 wherein said metal oxide is mesoporous.

5. The nanocomposite material of claim 1 wherein said nanocomposite material has a specific capacity of greater than about 400 mAh/g.

6. A method for forming an ordered nanocomposite material comprising the steps of:
providing graphene in a suspension;
dispersing the graphene with a surfactant;
adding a metal oxide precursor;
precipitating the metal oxide and allowing the graphene and the metal oxide to organize into self assembled structures, thereby forming a nanocomposite material precipitate having a series of ordered graphene and metal oxide layers, wherein the metal oxide layers and graphene layers are alternating positioned in a sandwich configuration and the metal oxide layers are directly bonded to the graphene layers forming the series of ordered layers.

7. The method of claim 6, wherein the step of precipitating is maintained for about one to about 24 hours.

8. The method of claim 7 including the further step of providing the suspension as containing water.

9. The method of claim 7 further comprising the step of heating the precipitate from 50 to 500 degrees C. to condense the metal oxide layers on the graphene layers.

10. The method of claim 6 further comprising the step of heating the precipitate from 50 to 500 degrees C. to remove the surfactant.

11. An energy storage device comprising a nanocomposite material which has at least two layers, each layer including a metal oxide layer directly bonded to a graphene layer, wherein the graphene layer has a thickness of from about 0.5 nm to 50 nm, and the metal oxide layers and graphene layers are alternatingly bonded to one another in the at least two layers.

12. The energy storage device of claim 11, wherein said nanocomposite material has a specific capacity of greater than about 400 mAh/g.

13. The energy storage device of claim 11, wherein the energy storage device is an electrochemical device having an anode, a cathode, an electrolyte, and a current collector.

14. The energy storage device of claim 11, wherein at least one of an electrode, an anode, a cathode, a separator, a current collector, an electrolyte, and combinations thereof includes a nanocomposite material which has at least two layers, each layer including a metal oxide layer directly bonded to the graphene layer, wherein the metal oxide layers and graphene layers alternate in position in the at least two layers forming a sandwich configuration.

15. The energy storage device of claim 13, wherein the anode contains the nanocomposite material, and wherein the anode contains less than 10% of carbon-based material by weight.

16. The energy storage device of claim 13, wherein the anode contains the nanocomposite material, and wherein the anode contains less than 5% of carbon-based material by weight.

17. The energy storage device of claim 13, wherein the cathode contains the nanocomposite material, and wherein the cathode contains less than 5% of carbon-based material by weight.

18. The energy storage device of claim 13, wherein the cathode contains the nanocomposite material, and wherein the cathode contains less than 2.5% carbon-based material by weight.

19. The energy storage device of claim 11 wherein the electrochemical device is a lithium ion battery.

20. A lithium ion battery electrode comprising a nanocomposite material which has at least two layers bonded to one another, each layer including a metal oxide layer directly bonded to a graphene layer, wherein the graphene layer has a thickness from about 0.5 nm to 50 nm, and wherein the metal oxide layers and graphene layers are alternatingly positioned in the at least two layers, and wherein said nanocomposite material has a specific capacity of greater than about 400 mAh/g, and wherein the layers are provided as an ordered, three dimensional assembly.

21. A nanocomposite material formed by the steps comprising: providing graphene in a suspension;
dispersing the suspension with a surfactant to provide multiple graphene layers wherein the graphene layer has a thickness of from about 0.5 nm to 50 nm;
adding a metal oxide precursor;
precipitating the metal oxide and allowing the graphene layers and the metal oxide to organize into self assembled structures thereby forming a series of ordered layers bonded to one another, wherein each layer comprises a metal oxide layer bonded to at least one graphene layer, wherein the metal oxide layers and graphene layers are alternatingly positioned in the ordered layers; and
heating the metal oxide layers and graphene layers to a temperature sufficient to remove the surfactant such that the metal oxide layers are directly bonded to the graphene layers.

22. The nanocomposite material of claim 21, wherein the nanocomposite material is formed into an ordered three-dimensional superstructure having multi length and multiphase building blocks.

23. The nanocomposite material of claim 21, wherein the graphene layers have a thickness between 3 nm and 20 nm.

24. The nanocomposite material of claim 21, wherein the nanocomposite material has a specific capacity of greater than about 400 mAh/g.

\* \* \* \* \*